United States Patent
Mateescu et al.

(10) Patent No.: US 8,887,025 B2
(45) Date of Patent: *Nov. 11, 2014

(54) TECHNIQUES FOR STORING DATA IN STUCK MEMORY CELLS

(71) Applicant: HGST Netherlands B.V., Amsterdam (NL)

(72) Inventors: Robert Eugeniu Mateescu, San Jose, CA (US); Luiz Franca-Neto, Sunnyvale, CA (US); Cyril Guyot, San Jose, CA (US); Hessam Mahdavifar, San Diego, CA (US); Zvonimir Bandic, San Jose, CA (US); Qingbo Wang, Irvine, CA (US)

(73) Assignee: HGST Netherlands B.V., Amsterdam (NL)

( * ) Notice: Subject to any disclaimer, the term of this patent is extended or adjusted under 35 U.S.C. 154(b) by 127 days.

This patent is subject to a terminal disclaimer.

(21) Appl. No.: 13/649,072

(22) Filed: Oct. 10, 2012

(65) Prior Publication Data

US 2013/0124943 A1    May 16, 2013

Related U.S. Application Data

(60) Provisional application No. 61/629,385, filed on Nov. 16, 2011.

(51) Int. Cl.
*G11C 29/00* (2006.01)
*G06F 11/10* (2006.01)

(52) U.S. Cl.
CPC .................................. *G06F 11/1008* (2013.01)
USPC ........................................... 714/766; 714/719

(58) Field of Classification Search
USPC .................................................. 714/719, 766
See application file for complete search history.

(56) References Cited

U.S. PATENT DOCUMENTS

| | | | |
|---|---|---|---|
| 3,949,208 A | 4/1976 | Carter | |
| 6,839,275 B2 | 1/2005 | Van Brocklin et al. | |
| 6,996,017 B2 | 2/2006 | Scheuerlein et al. | |
| 8,144,037 B2 | 3/2012 | Monro | |
| 8,255,742 B2 * | 8/2012 | Ipek et al. | 714/6.13 |
| 2010/0277989 A1 | 11/2010 | Elfadel et al. | |
| 2010/0332895 A1 | 12/2010 | Billing et al. | |
| 2011/0080781 A1 | 4/2011 | Goux | |
| 2011/0119538 A1 * | 5/2011 | Ipek et al. | 714/719 |

(Continued)

OTHER PUBLICATIONS

Eric Deal, "Trends in NAND Flash Memory Error Correction," Jun. 2009, Cyclic Design, pp. 1-11.

(Continued)

*Primary Examiner* — Sam Rizk
(74) *Attorney, Agent, or Firm* — Steven J. Cahill

(57) ABSTRACT

A data storage system includes a memory circuit and a control circuit. The control circuit is operable to receive data bits provided for storage in memory cells of the memory circuit. The control circuit is operable to compare each of the data bits provided for storage in a corresponding one of the memory cells having a stuck-at fault to a value of the stuck-at fault, and to invert each of the data bits having a different value than the value of the stuck-at fault of the corresponding one of the memory cells to generate encoded data bits. The control circuit is operable to generate redundant bits that indicate the encoded data bits to invert to regenerate the data bits.

20 Claims, 19 Drawing Sheets

(56) References Cited

U.S. PATENT DOCUMENTS

2011/0296258 A1  12/2011  Schechter et al.
2011/0307670 A1  12/2011  Franceshini et al.
2011/0317480 A1  12/2011  Lung et al.

OTHER PUBLICATIONS

R. Micheloni, et al., "A 4Gb 2b/cell NAND Flash Memory with Embedded 5b BCH ECC for 36MB/s System Read Throughput," 2006 IEEE International Solid-State Circuits Conference, Feb. 6, 2006, Non-Volatile Memory, 7.6, pp. 1-10.
U.S. Appl. No. 13/649,007, filed Oct. 10, 2012.
H.-S. Philip Wong, et al., "Phase Change Memory," vol. 98, No. 12, Dec. 2010, Proceedings of the IEEE, pp. 2201-2227.
Nak Hee Seong, et al., "SAFER: Stuck-At-Fault Error Recovery for Memories," 2010 43rd Annual IEEE/ACM International Symposium on Microarchitecture, pp. 115-124.
Stuart Schechter et al., "Use ECP, not ECC, for hard failures in resistive memories," ISCA '10 Proceedings of the 37th annual international symposium on Computer architecture, Jun. 2010, pp. 141-152.
U.S. Appl. No. 13/649,108, filed Oct. 10, 2012.
U.S. Appl. No. 13/649,098, filed Oct. 10, 2012.
Maddah et al., "Data Dependent Sparing to Manage Better-Than-Bad Blocks," Computer Science Department, University of Pittsburgh, Apr. 30, 2012.

* cited by examiner

FIG. 6A

Data Bits: | 1 | 1 | 0 | 1 | 1 | 0 | 0 | 0 | 0 | 1 | 0 | 0 | 1 | 1 | 1 | 1 | 0 | 1 | 0 | 1 | 1 | 0 | 1 | 0 | 0 |

Bit Positions: 0–24

Memory Cells: S0 at positions 2–4, 12–13; S1 at positions 18–19, 21

FIG. 6B

Encoder: M at position 1, U at position 10, M at position 18

FIG. 6C

Base Vector 1: [1, 1]
Base Vector 2: [1, −1]
Base Vector 3: [−1, 1]
Base Vector 4: [−1, −1]

FIG. 6D

Encoded Data Bits: M at position 1 (Base Vector 1), positions 4–9 Base Vector 4, U at position 10, positions 11–16 Base Vector 4, M at position 18, positions 19–24 Base Vector 3

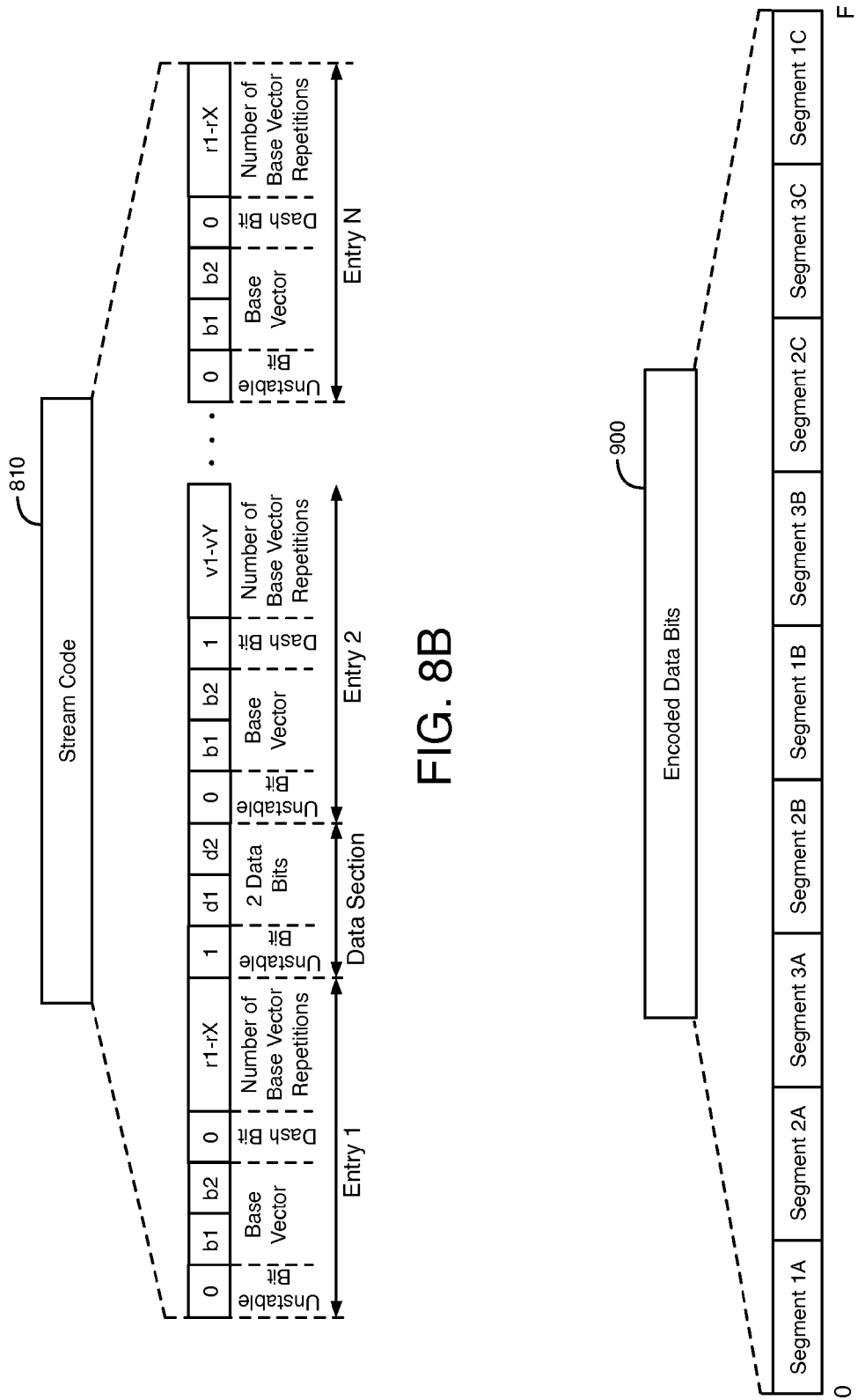

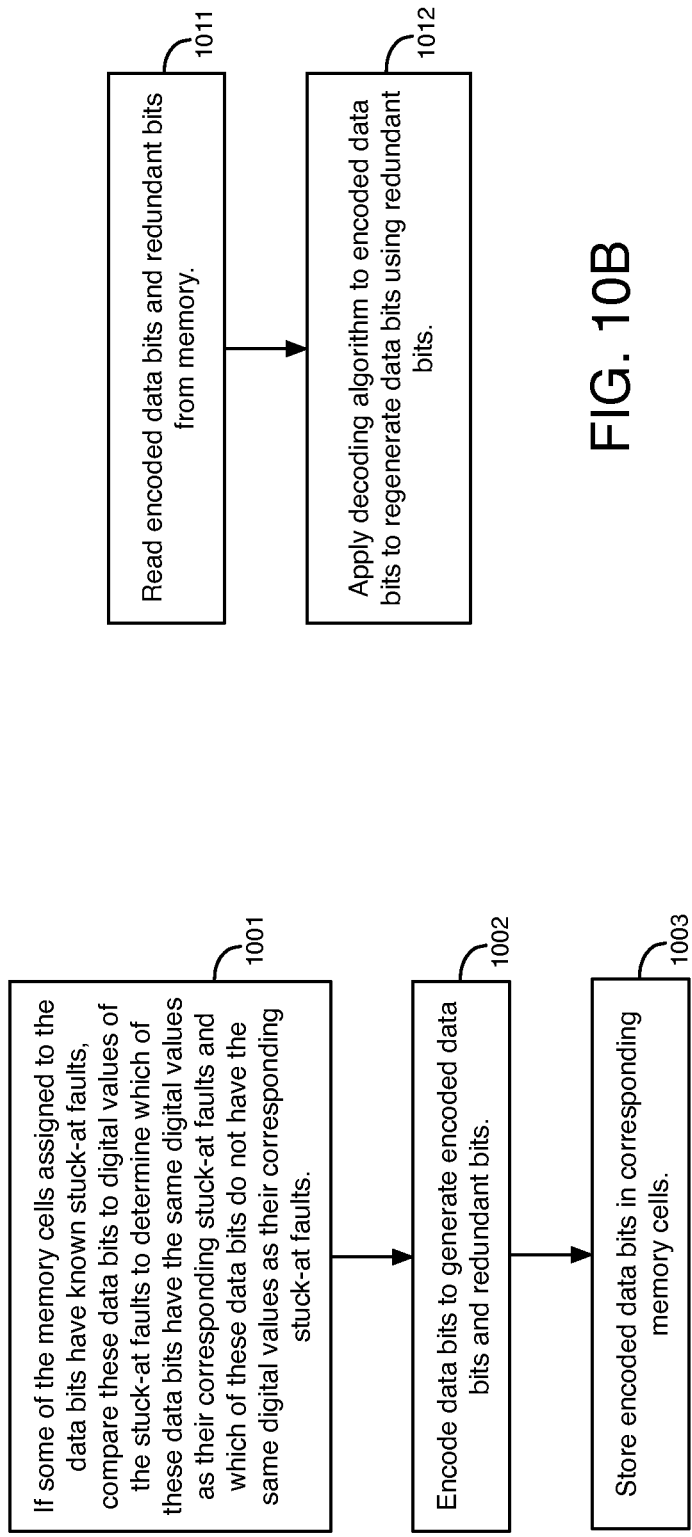

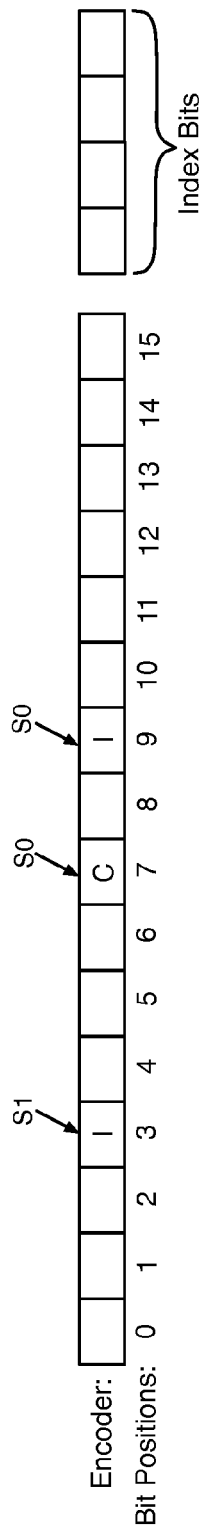
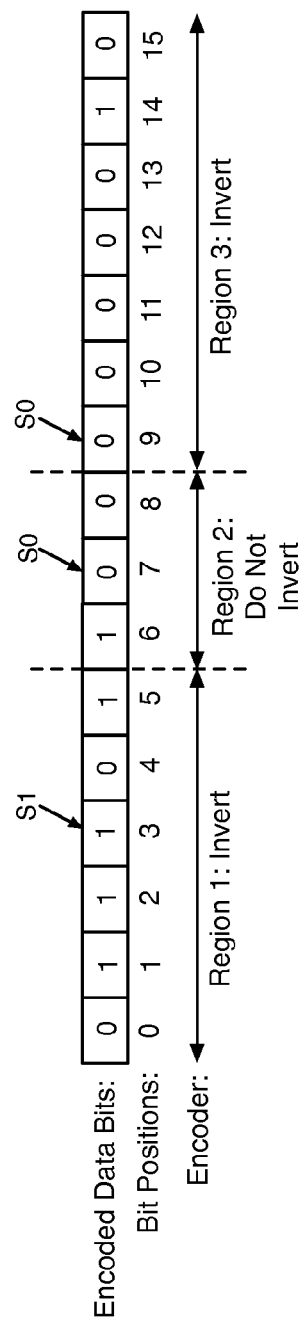
FIG. 11A
FIG. 11B
FIG. 11C

TECHNIQUES FOR STORING DATA IN STUCK MEMORY CELLS

CROSS REFERENCE TO RELATED APPLICATION

This patent application claims the benefit of U.S. provisional patent application 61/629,385, filed Nov. 16, 2011, which is incorporated by reference herein in its entirety.

FIELD OF THE DISCLOSURE

The present disclosure relates to data storage systems, and more particularly, to techniques for storing data in memory cells where some of the memory cells are stuck at one of two possible stable states.

BACKGROUND

Many data communication systems use error correction encoders and decoders to detect and correct errors in data. Storage systems are frequently modeled as a communication system with a delay, where data is transmitted during a write operation and data is received at a read operation. In a storage system, random errors can be corrected up to a rate of about $1 \times 10^{-4}$ with an acceptable overhead. To protect against an error rate of about $1 \times 10^{-4}$, an error correction encoder may generate encoded bits having about 10% more bits than its input bits.

Phase change memory (PCM) is a class of non-volatile semiconductor memory. PCM devices have many advantages over traditional non-volatile flash memory. However, PCM devices may generate a large number of errors that are induced by writing cycle degradation. For example, a PCM device may generate errors at a rate of $1 \times 10^{-2}$ or greater if cycled to millions or tens of millions of cycles.

At the limits of endurance, the error rate in non-volatile memory devices is dominated by writing cycle degradation, not by random errors. Errors that are dominated by degradation include stuck-at faults and unstable bits. Each of these two types of errors have different statistics than the random errors that are commonly assumed in data communication systems and corresponding error correcting approaches.

BRIEF SUMMARY

According to some embodiments, a data storage system includes a memory circuit and a control circuit. The control circuit is operable to receive data bits provided for storage in memory cells of the memory circuit. The control circuit is operable to compare each of the data bits provided for storage in a corresponding one of the memory cells having a stuck-at fault to a value of the stuck-at fault, and to invert each of the data bits having a different value than the value of the stuck-at fault of the corresponding one of the memory cells to generate encoded data bits. The control circuit is operable to generate redundant bits that indicate the encoded data bits to invert to regenerate the data bits.

Various objects, features, and advantages of the present invention will become apparent upon consideration of the following detailed description and the accompanying drawings.

BRIEF DESCRIPTION OF THE DRAWINGS

FIGS. 6A-6D illustrate how exemplary base vectors can be applied to an exemplary set of data bits to generate encoded data bits that accommodate error vectors indicating stuck-at faults and unstable values of memory cells, according to an embodiment of the present invention.

FIG. 8B illustrates an example of a stream code generated by an encoder that generates the encoded data bits of FIG. 8A, according to an embodiment of the present invention.

FIG. 9A illustrates an example of encoded data bits having discontinuous segments that are generated using an exemplary constraint, according to an embodiment of the present invention.

FIG. 10A illustrates another example of a process for encoding data bits to generate encoded data bits and redundant bits for accommodating memory cells having stuck-at faults, according to an embodiment of the present invention.

FIG. 10B illustrates an example of a process for decoding the encoded data bits generated in the process of FIG. 10A to regenerate the data bits using the redundant bits, according to an embodiment of the present invention.

FIG. 11A illustrates an example of data bits that are provided for storage in memory cells having stuck-at faults, according to an embodiment of the present invention.

FIG. 11B illustrates an exemplary application of an encoding technique that encodes data bits by only changing the data bits having digital values that do not match the values of the stuck-at faults of the corresponding memory cells, according to an embodiment of the present invention.

FIG. 11C illustrates an exemplary application of an encoding technique that encodes data bits by changing data bits in regions, according to an embodiment of the present invention.

DETAILED DESCRIPTION

According to some embodiments described herein, an encoder analyzes input data bits to generate encoded data bits and redundant bits. The encoded data bits generated by the encoder are stored in a memory circuit. The encoded data bits accommodate memory cells in the memory circuit that have stuck-at faults. As an example, the memory circuit may be a phase change memory circuit (e.g., that uses chalcogenide glass) or another type of memory circuit that has stuck-at faults.

A memory cell having a stuck-at fault is a memory cell that can only store a single digital value. A memory cell having a stuck-at fault value of 1 can only store a logic high value, and a memory cell having a stuck-at fault value of 0 can only store a logic low value. Thus, only a logic high value can be read from a memory cell having a stuck-at fault value of 1 (i.e., stuck-at 1), and only a logic low value can be read from a memory cell having a stuck-at fault value of 0 (i.e., stuck-at 0). Memory cells having stuck-at faults generally have stuck-at fault values that are stable over time.

The techniques described herein are directly applicable to single-level and multi-level memory cells. Single-level memory cells can only store one bit per memory cell. Multi-level memory cells can store more than one bit per memory cell. For example, if a memory cell stores 2 bits, and it becomes stuck, then the values of those two bits are fixed, and they can be treated as two separate stuck-at fault locations. Because the location of one of the stuck-at faults is known, the location of the other stuck-at fault is also known. As a result, for the same stuck-at fault error rate, less redundant bits can be generated for multi-level memory cells than the redundant bits that are generated for single-level memory cells. The number of redundant bits may be smaller, for example, by a factor equal to the number of bits per memory cell.

If some of the memory cells in the memory circuit have stuck-at faults, the values of the stuck-at faults and the addresses of the memory cells having the stuck-at faults are determined before the encoding process and are provided to the encoder. The encoder encodes data bits to generate encoded data bits and redundant bits using the values and addresses of the stuck-at faults. The redundant bits may be stored in the same memory circuit as the encoded data bits or in a different memory circuit.

Subsequently, the encoded data bits and the redundant bits are read from memory and provided to a decoder. The decoder decodes the encoded data bits using the redundant bits to regenerate the data bits. The data bits regenerated by the decoder do not contain errors that are caused by the known stuck-at faults in the memory circuit.

Figure 1:
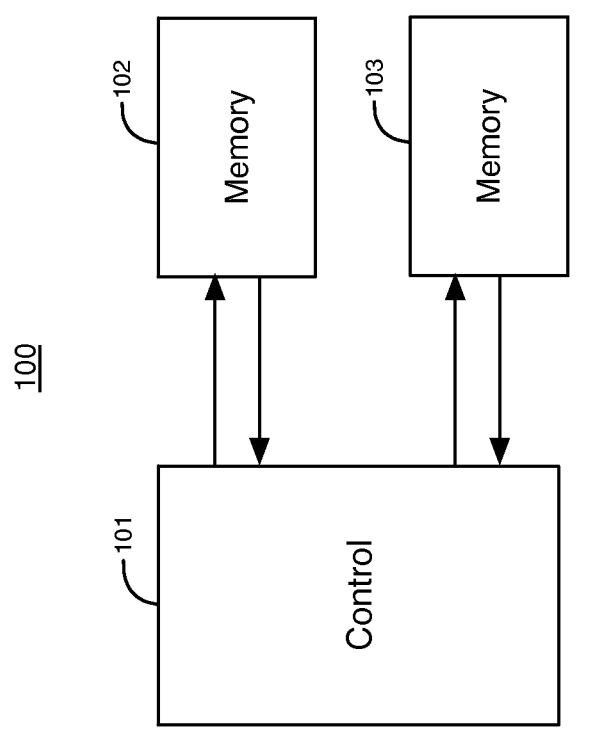
FIG. 1 illustrates an example of a data storage system that can include embodiments of the present invention.

FIG. 1 illustrates an example of a data storage system 100 that can include embodiments of the present invention. System 100 includes a control circuit 101, a memory circuit 102, and a memory circuit 103. Control circuit 101 may be, for example, a memory controller circuit, a processor circuit, or any other type of control circuit that encodes and/or decodes data for storage in memory circuits 102-103. Control circuit 101 provides encoded data to and receives encoded data from memory circuits 102-103. Control circuit 101, memory circuit 102, and memory circuit 103 may be in the same integrated circuit or in separate integrated circuits. Thus, system 100 may be a single integrated circuit device that includes circuits 101-103. Alternatively, system 100 may include three separate integrated circuit devices 101-103.

Figure 2:
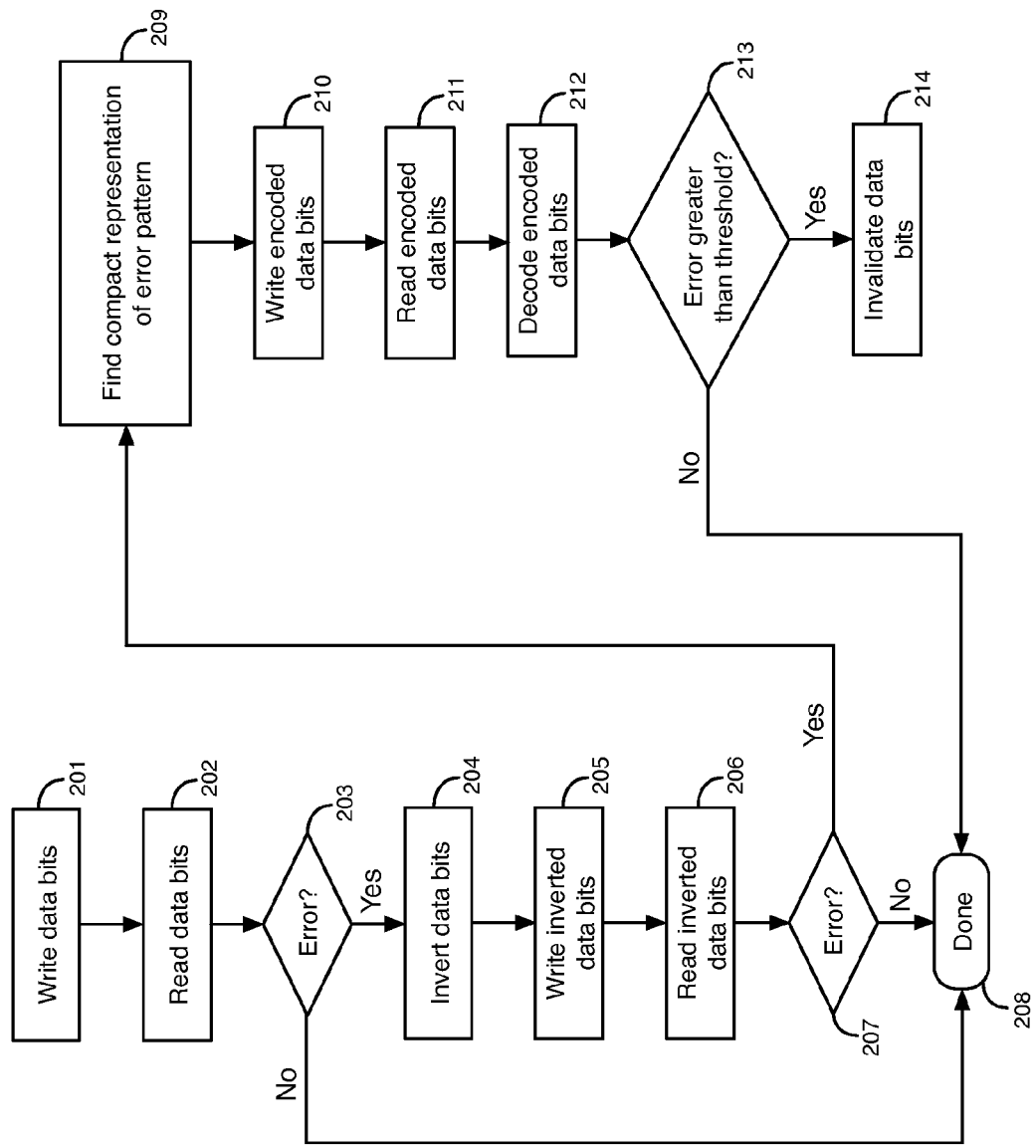
FIG. 2 is a flow chart that illustrates a process for encoding data to match stuck-at faults in corresponding memory cells, according to an embodiment of the present invention.

FIG. 2 is a flow chart that illustrates a process for encoding data to match any stuck-at faults in corresponding memory cells, according to an embodiment of the present invention. Initially, data bits are provided for storage in memory cells of a memory circuit. The memory circuit may be, for example, memory circuit 102 or 103. The operations of FIG. 2 may, for example, be performed by control circuit 101.

In operation 201, the data bits are written to the memory cells of the memory circuit. In operation 202, the data bits are read from the memory cells of the memory circuit. In operation 203, the data bits read from the memory cells of the memory circuit are compared to the original data bits.

The data bits read from the memory cells may, for example, be compared to an error-free copy of the original data bits stored in another memory circuit. If it is determined at operation 203 that all of the data bits read from the memory cells of the memory circuit match the original data bits, then the process terminates at operation 208.

If any of the data bits read from the memory cells do not match corresponding ones of the original data bits, then these data bits may have been stored in memory cells with errors. For example, some of the data bits may have been stored in memory cells having stuck-at faults with digital values that are different than the digital values of the corresponding ones of these data bits. If it is determined at operation 203 that any of the data bits read from the memory cells of the memory circuit do not match corresponding ones of the original data bits, then the digital value of each of the data bits is inverted in operation 204. The inverted data bits are then written to the same memory cells of the memory circuit in operation 205. The inverted data bits are subsequently read from the memory cells of the memory circuit in operation 206.

In operation 207, the inverted data bits read from the memory cells of the memory circuit are inverted again and compared to the original data bits (e.g., an error-free copy of the original data bits stored in another memory circuit). Alternatively, the original data bits are inverted and then compared to the inverted data bits read from the memory cells of the memory circuit. If it is determined at operation 207 (in conjunction with operation 203) that all of the data bits read from the memory cells of the memory circuit match the original data bits, or if all of the inverted data bits read from the memory cells match the inverted original data bits, then the process terminates at operation 208.

If any of the data bits read from the memory cells do not match a corresponding one of the original data bits, or if any of the inverted data bits read from the memory cells do not match a corresponding one of the inverted original data bits, then that data bit may have been stored in a memory cell with an error. For example, some of the data bits may have been stored in memory cells with stuck-at faults having digital values that are different than the inverted digital values of the corresponding ones of these data bits. As another example, some of the data bits may have been stored in memory cells having unstable values.

If it is determined at operations 203 and 207 that any of the data bits read from the memory cells do not match a corresponding one of the original data bits, or if any of the inverted data bits read from the memory cells do not match a corresponding one of the inverted original data bits, an algorithm is performed in operation 209 to find a compact representation of the error pattern represented by the stuck-at faults and unstable values of the memory cells of the memory circuit. The algorithm encodes the data bits to generate encoded data bits and redundant bits. An example of such an algorithm is discussed in further detail below with respect to FIG. 5.

In operation 210, the encoded data bits are written to the memory cells of the memory circuit. In operation 211, the encoded data bits are subsequently read from the memory cells of the memory circuit. In operation 212, the encoded data bits read from the memory cells of the memory circuit are decoded to generate decoded data bits, and the decoded data bits are compared to the original data bits (e.g., an error-free copy of the original data bits stored in another memory circuit). The decoded data bits that do not match corresponding ones of the original data bits are in error. If the number of the decoded data bits in error exceeds a threshold at operation 213, the decoded data bits are invalidated in operation 214. If the memory addresses that were targeted for the data bits are not suitable for those data bits, those memory addresses are marked so that they are never used again. For example, the memory addresses may have too many memory cells having unstable values. If the number of the decoded data bits in error does not exceed the threshold at operation 213, the decoded data bits are valid, and the process terminates at operation 208.

In some embodiments, repeated read and write operations can be performed to determine which memory cells present errors that are not consistent with stuck-at fault behavior. Such memory cells are identified as unstable memory cells. The encoder prevents any data bits or encoded data bits from being stored in the memory cells identified as unstable. As an example, a bit can be written to a memory cell and then read from the memory cell. If the bit read from the memory cell is in error, the same bit is inverted, written to the memory cell and then read from the memory cell. If the inverted bit read from the memory cell is in error, then the memory cell may be identified as an unstable memory cell. Sometimes random noise in the reading circuitry may cause a memory cell to be mischaracterized as unstable using this technique. In some embodiments, an error correction code (ECC) wrap can be used to identify memory cells that may have been mischaracterized as unstable.

Figure 3:
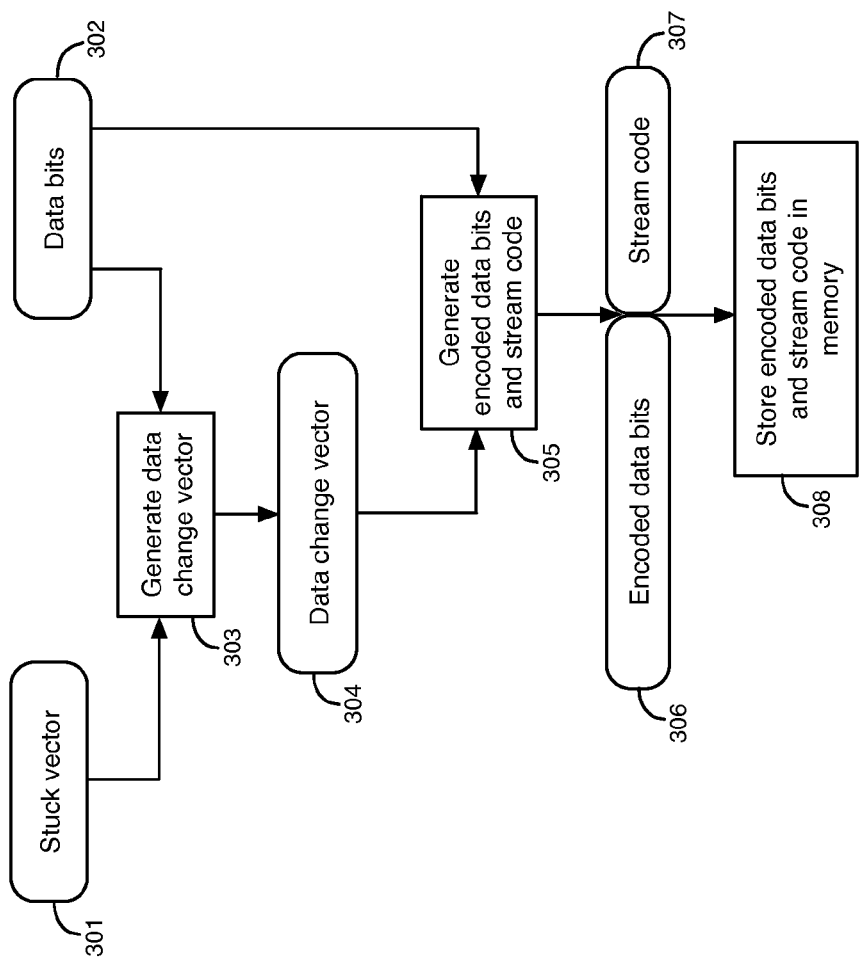
FIG. 3 is a flow chart that illustrates a process for generating encoded data bits for storage in memory cells of a memory circuit having stuck-at faults, according to an embodiment of the present invention.

FIG. 3 is a flow chart that illustrates a process for generating encoded data bits for storage in memory cells of a memory circuit having stuck-at faults, according to an embodiment of the present invention. The process of FIG. 3 may, for example, be performed by control circuit 101.

FIG. 3 illustrates a stuck vector 301 and data bits 302. The data bits 302 are provided for storage in memory cells of a memory circuit. One or more of the memory cells of the memory circuit have stuck-at faults. The digital values of the stuck-at faults and the addresses of the stuck-at faults of the memory cells are indicated by stuck vector 301. In operation 303, a data change vector 304 is generated using the stuck vector 301 and the data bits 302. The data change vector 304 indicates which of the data bits 302 are to be inverted prior to storage in the memory cells to generate encoded data bits that match the digital values of the stuck-at faults of the corresponding memory cells.

In operation 305, the data change vector 304 is applied to data bits 302 to generate encoded data bits 306 and stream code 307. The encoded data bits 306 are the result of applying the data change vector 304 to the data bits 302. If data change vector 304 indicates that the digital values of one or more of the stuck-at faults do not match the digital values of the corresponding data bits, the digital values of those data bits are inverted during operation 305 so that each of the encoded data bits stored in a memory cell having a stuck-at fault has the same digital value as that stuck-at fault.

The stream code 307 includes redundant bits that are usable by a decoder to decode encoded data bits 306 to regenerate data bits 302. In operation 308, the encoded data bits 306 and the stream code 307 are stored in memory. The encoded data bits 306 are stored in the corresponding memory cells. Subsequently, the encoded data bits 306 are read from the corresponding memory cells, and then decoded using stream code 307 to regenerate the data bits 302.

Figure 4:
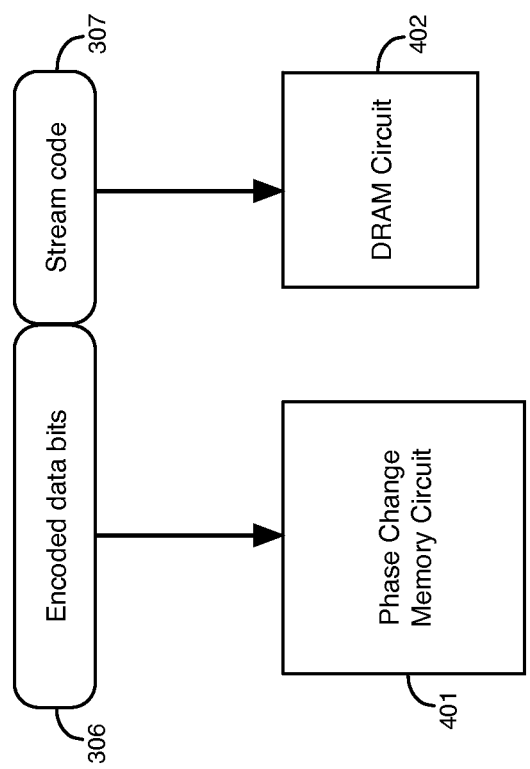
FIG. 4 illustrates an example of how the encoded data bits and the stream code generated by the process of FIG. 3 can be stored in different memory circuits, according to an embodiment of the present invention.

FIG. 4 illustrates an example of how the encoded data bits and the stream code generated by the process of FIG. 3 can be stored in different memory circuits, according to an embodiment of the present invention. In the embodiment of FIG. 4, the encoded data bits 306 are stored in a phase change memory circuit 401, and the stream code 307 is stored in a dynamic random access memory (DRAM) circuit 402. Some of the memory cells in the phase change memory circuit 401 may have stuck-at faults, as described above.

Errors may also occur in the stream code 307 when it is written to and subsequently read from DRAM circuit 402. After the stream code 307 is read from DRAM circuit 402 prior to the decoding process, any errors in the stream code 307 are corrected using, for example, an error detection and correction encoding technique. The stream code that is provided to the decoder ideally is identical to the stream code 307 generated during operation 305. If the stream code 307 is written to phase change memory cells, error correcting schemes can be used to make sure the stream code 307 is read without errors. Because the stream code 307 is usually much shorter in length than the encoded data bits it refers to, the stream code 307 allows for strong error correcting approaches to be used to protect the stream code 307 without significantly increasing the overall amount of redundant bits.

Figure 5:
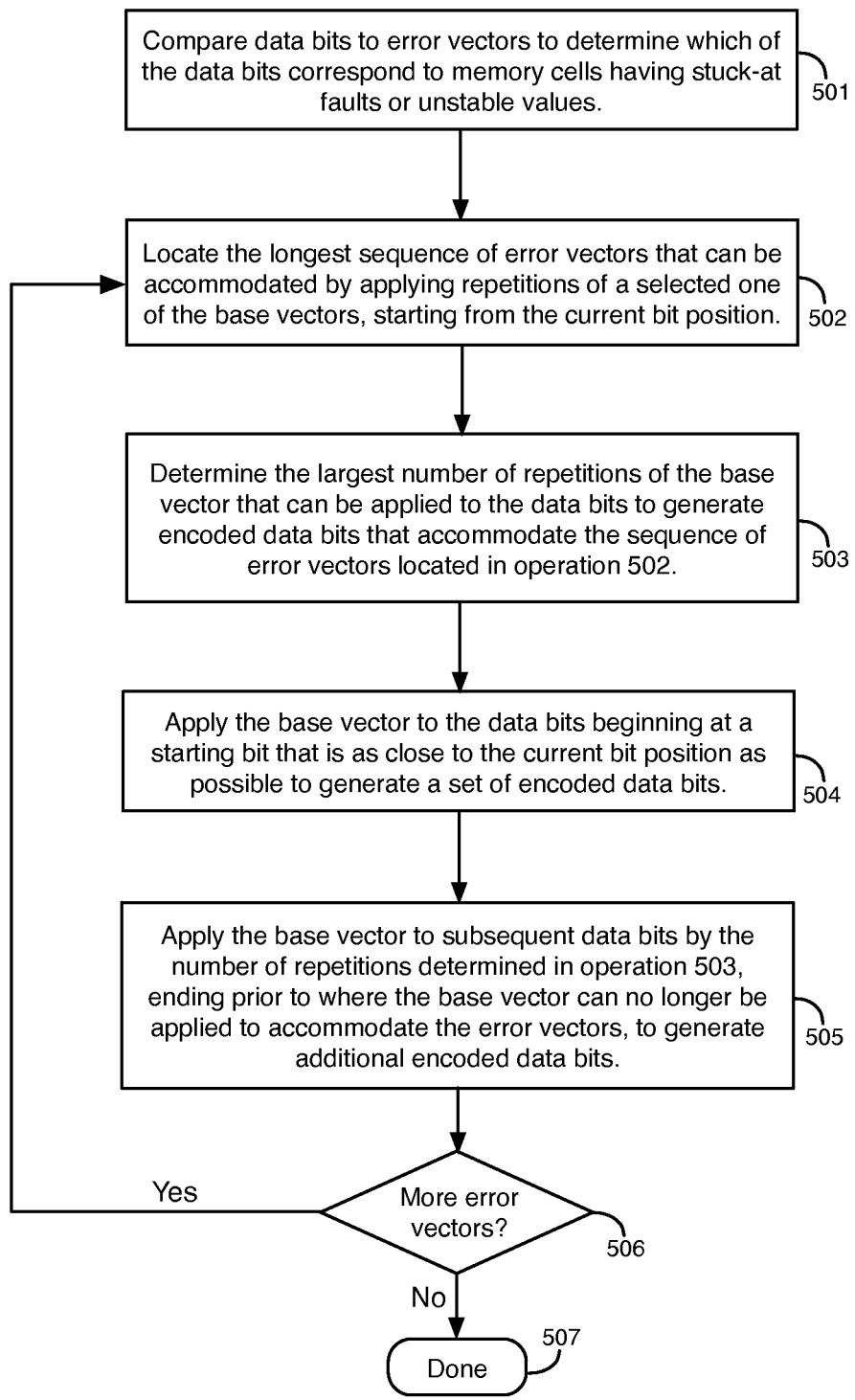
FIG. 5 illustrates examples of operations that are performed by an algorithm to encode data bits to generate encoded data bits, according to an embodiment of the present invention.

FIG. 5 illustrates examples of operations that are performed by an algorithm to encode data bits to generate encoded data bits, according to an embodiment of the present invention. The algorithm may, for example, be performed by an encoder in control circuit 101. The algorithm encodes data bits to generate encoded data bits that are compatible with stuck-at faults in corresponding memory cells of a memory circuit where the encoded data bits will be stored. The algorithm also generates a stream code. A decoder uses the stream code to decode the encoded data bits to regenerate the original data bits.

An example of such an algorithm described with respect to FIG. 5 applies base vectors to the data bits to generate the encoded data bits. If a subset of the encoded data bits are to be stored in memory cells having stuck-at faults, the base vectors cause the subset of the encoded data bits to have the same digital values as their corresponding stuck-at faults. The base vectors may, for example, invert some of the data bits and not invert the remaining data bits to generate the encoded data bits.

If one of the data bits provided for storage in a memory cell having a stuck-at fault has the same digital value as that stuck-at fault, then the base vector applied to that data bit does not invert that data bit when generating a corresponding encoded data bit. If one of the data bits provided for storage in a memory cell having a stuck-at fault has a different digital value than that stuck-at fault, then the base vector applied to that data bit inverts that data bit when generating a corresponding encoded data bit. The base vectors may invert or not invert data bits that are provided for storage in memory cells not having stuck-at faults when generating the corresponding encoded data bits. The algorithm may also modify the data bits to generate a stream code that accommodates memory cells in the memory circuit having unstable values. A memory cell having an unstable value cannot reliably store either digital value 1 or 0. According to some of the embodiments described herein, the addresses of unstable memory cells are known at the time control circuit 101 encodes the data bits to be written to memory. The addresses of the unstable memory cells are used to generate the encoded data bits as described herein.

Initially, the algorithm receives data bits that are provided for storage in memory cells of a memory circuit (e.g., memory circuit 102 or 103). Prior to operation 501, error vectors are generated that indicate the digital values and addresses of any stuck-at faults (e.g., stuck vectors 301) in the memory cells. The error vectors also indicate the addresses of any of the memory cells that have unstable values. The error vectors are provided to the algorithm. In operation 501, the algorithm compares the data bits to the error vectors to determine which of the data bits correspond to memory cells having stuck-at faults or unstable values.

In operation 502, the algorithm locates the longest sequence of error vectors that can be accommodated by applying repetitions of a selected one of the base vectors, starting from the current bit position. A base vector accommodates an error vector if the base vector can be applied to a subset of the data bits to generate encoded data bits that can be stored in the corresponding memory cells having that error vector without being corrupted by that error vector.

In operation 503, the algorithm determines the largest number of repetitions of the base vector that can be applied to the data bits to generate encoded data bits that accommodate the sequence of error vectors located in operation 502. The algorithm generates a stream code that indicates the base vector selected in operation 502 and the number of repetitions determined in operation 503. The stream code may be stored in the same memory circuit as the encoded data bits or in a different memory circuit as described above with respect to FIG. 4.

In operation 504, the algorithm applies the selected base vector to the data bits beginning at a starting bit that is as close to the current bit position as possible to generate a first set of encoded data bits. In operation 505, the algorithm applies the selected base vector to subsequent data bits by the number of repetitions determined in operation 503, ending prior to where the base vector can no longer be applied to accommodate the error vectors, to generate additional encoded data bits. In operations 504-505, the algorithm generates encoded data bits that accommodate the sequence of error vectors located in operation 502 by applying the base vector selected in operation 502 to the data bits.

In decision operation 506, the algorithm determines if there are any more error vectors in the memory cells that have not been accommodated by previous applications of base vectors to the data bits to generate encoded data bits. If all of the error vectors have been accommodated at decision operation 506, the algorithm terminates at operation 507. If there are additional error vectors that have not been accommodated at decision operation 506, the algorithm repeats operations 502-506.

FIGS. 6A-6D illustrate how exemplary base vectors can be applied to an exemplary set of data bits to generate encoded data bits that accommodate error vectors indicating stuck-at faults and unstable values of memory cells, according to an embodiment of the present invention. FIG. 6A illustrates an exemplary set of 25 data bits in bit positions 0-24. The 25 data bits shown in FIG. 6A are provided to an encoder for storage in 25 corresponding memory cells of a memory circuit. Each of the data bits is provided for storage in a corresponding memory cell having the same bit position as that data bit. For example, the leftmost data bit shown in FIG. 6A at bit position 0 is provided for storage in the corresponding leftmost memory cell shown in FIG. 6A at bit position 0.

Some of the memory cells shown in FIG. 6A have stuck-at faults. The memory cells having stuck-at 0 faults are identified by S0 in FIG. 6A. The memory cells at bit positions 2, 4, and 13 have stuck-at 0 faults. The memory cells having stuck-at 1 faults are identified by S1 in FIG. 6A. The memory cells at bit positions 18 and 21 have stuck-at 1 faults. The memory cell at bit position 10 has an unstable value.

FIG. 6B illustrates examples of modifications that an encoder makes to data bits so that the encoded data bits accommodate errors in memory cells, according to an embodiment of the present invention. The encoder may, for example, perform the algorithm described above with respect to FIG. 5. In the example of FIG. 6B, the encoder uses the data bits and the errors in the memory cells that are shown in FIG. 6A.

In the example of FIG. 6B, the memory cells corresponding to bit positions 2, 4, 10, 13, 18, and 21 have errors, as described above with respect to FIG. 6A.

The data bit in bit position 4 has a digital value of 1, and the memory cell at bit position 4 has a stuck-at 0 fault. The data bit in bit position 13 has a digital value of 1, and the memory cell at bit position 13 has a stuck-at 0 fault. The data bit in bit position 21 has a digital value of 0, and the memory cell at bit position 21 has a stuck-at 1 fault. Thus, the data bits in bit positions 4, 13, and 21 have different digital values than the stuck-at faults of their corresponding memory cells. The data bits in bit positions 4, 13, and 21 are inverted before they are stored in the memory cells at bit positions 4, 13, and 21, respectively. The encoder inverts the digital value of each of the data bits in bit positions 4, 13, and 21 to generate encoded data bits in bit positions 4, 13, and 21, respectively, as shown by the I designations in these bit positions in FIG. 6B.

The data bit in bit position 2 has a digital value of 0, and the memory cell at bit position 2 has a stuck-at 0 fault. The data bit in bit position 18 has a digital value of 1, and the memory cell at bit position 18 has a stuck-at 1 fault. Thus, the data bits in bit positions 2 and 18 have the same digital values as the stuck-at faults of their corresponding memory cells. The data bits in bit positions 2 and 18 can be stored in the memory cells at bit positions 2 and 18, respectively, without inverting their digital values. Therefore, the encoder maintains the digital value of each of the data bits in bit positions 2 and 18 constant when generating encoded data bits at bit positions 2 and 18, respectively, as shown by the M designations in these bit positions in FIG. 6B. The memory cell at bit position 10 is unstable and cannot store any data as indicated by the U designation in FIG. 6B.

FIG. 6C illustrates four exemplary base vectors that can be applied to data bits to generate encoded data bits, according to an embodiment of the present invention. A base vector may have any number of values. In the example of FIG. 6C, each of the four base vectors 1-4 has two values. Each of the two values in each of the base vectors 1-4 is either 1 or −1. In the four base vectors 1-4 shown in FIG. 6C, a value of −1 indicates to invert a data bit during encoding, and a value of 1 indicates not to invert the data bit during encoding. Thus, 1 indicates to maintain the digital value of the data bit constant during encoding.

According to additional embodiments, other base vector sets can be applied to data bits to generate encoded data bits that accommodate stuck-at faults. For example, a set of 8 base vectors with each base vector having three bits can be used to generate the encoded data bits. Larger base vectors can encode more data bits with less applications of the base vectors. However, larger base vectors generate more complexity when the encoder and decoder process each base vector. As another example, a base vector set can be formed by only 2 base vectors, such that each of the 2 base vectors has one bit represented by a value of 1 or −1.

Each application of each base vector in FIG. 6C affects two data bits. If base vector 1 is applied to two data bits, neither of the two data bits are inverted to generate two encoded data bits. If base vector 2 is applied to first and second data bits, the first data bit is not inverted to generate a first encoded data bit, and the second data bit is inverted to generate a second encoded data bit. If base vector 3 is applied to first and second data bits, the first data bit is inverted to generate a first encoded data bit, and the second data bit is not inverted to generate a second encoded data bit. If base vector 4 is applied to two data bits, both of the two data bits are inverted to generate two encoded data bits.

FIG. 6D illustrates examples of base vectors that an encoder applies to an exemplary set of data bits to generate encoded data bits that accommodate an exemplary set of stuck-at faults in memory cells, according to an embodiment of the present invention. The encoder may, for example, perform the algorithm described above with respect to FIG. 5. In the example of FIG. 6D, the encoder uses the data bits and the errors in the memory cells that are shown in FIG. 6A, the modifications that are shown in FIG. 6B, and the base vectors of FIG. 6C.

In the example of FIG. 6D, bit position 0 is the starting bit. As shown in FIG. 6D, the encoder applies base vector 1 (1, 1) to the four data bits in bit positions 0-3. Each application of each of the base vectors shown in FIG. 6C affects two data bits. Therefore, base vector 1 is applied twice, corresponding to one repetition of base vector 1, in the example of FIG. 6D, so that base vector 1 affects each of the four data bits in bit positions 0-3. The encoder maintains the digital value of each of the data bits in bit positions 0-3 constant when generating the encoded data bits at bit positions 0-3. Thus, the encoded data bit in bit position 2 matches the digital value of the stuck-at 0 fault in the memory cell at bit position 2.

As shown in FIG. 6D, the encoder applies base vector 4 (−1, −1) to the six data bits in bit positions 4-9. Base vector 4 is applied three times, corresponding to two repetitions of base vector 4, in the example of FIG. 6D, so that base vector 4 affects each of the six data bits in bit positions 4-9. The encoder inverts the digital value of each of the data bits in bit positions 4-9 to generate the encoded data bits at bit positions 4-9. The data bit at bit position 4 is inverted so that the encoded data bit at bit position 4 matches the digital value of the stuck-at 0 fault in the memory cell at bit position 4.

The encoder prevents any of the data bits from being stored in the memory cells that have unstable values. The memory cell at bit position 10 has an unstable value. Therefore, the encoder prevents a data bit or an encoded data bit from being stored in the memory cell at bit position 10.

As shown in FIG. 6D, the encoder applies base vector 4 (−1, −1) to the six data bits in bit positions 11-16. Base vector 4 is applied three times, corresponding to two repetitions of base vector 4, in the example of FIG. 6D, so that base vector 4 affects each of the six data bits in bit positions 11-16. The encoder inverts the digital value of each of the data bits in bit positions 11-16 to generate the encoded data bits at bit positions 11-16. The data bit at bit position 13 is inverted so that the encoded data bit at bit position 13 matches the digital value of the stuck-at 0 fault in the memory cell at bit position 13.

As shown in FIG. 6D, the encoder applies base vector 3 (−1, 1) to the eight data bits in bit positions 17-24. Base vector 3 is applied four times, corresponding to three repetitions of base vector 3, in the example of FIG. 6D, so that base vector 3 is applied to each of the eight data bits in bit positions 17-24. The encoder inverts the digital value of each of the data bits in bit positions 17, 19, 21, and 23 to generate encoded data bits in bit positions 17, 19, 21, and 23, respectively. The data bit at bit position 21 is inverted so that the encoded data bit at bit position 21 matches the digital value of the stuck-at 1 fault in the memory cell at bit position 21. The encoder does not invert the digital values of the data bits in bit positions 18, 20, 22, and 24 to generate encoded data bits at bit positions 18, 20, 22, and 24, respectively. The data bit at bit position 18 is not inverted so that the encoded data bit at bit position 18 matches the digital value of the stuck-at 1 fault in the memory cell at bit position 18.

Figure 7A:
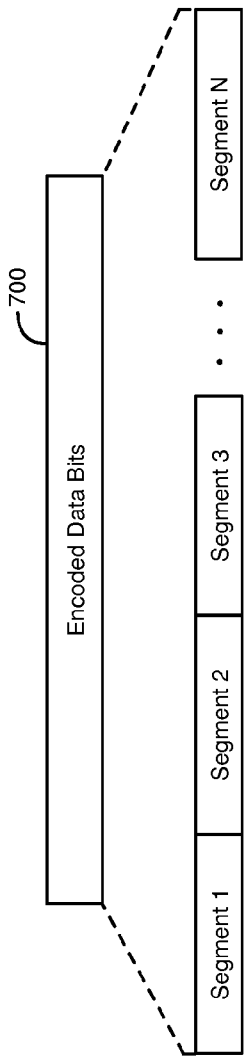
FIG. 7A illustrates an exemplary set of encoded data bits having segments, according to an embodiment of the present invention.

FIG. 7A illustrates an exemplary set of encoded data bits 700 having segments, according to an embodiment of the present invention. An encoder may generate the encoded data bits 700 using, for example, the algorithm described above with respect to FIG. 5.

Encoded data bits 700 include an N number of segments of encoded data bits. N may be any positive integer greater than 0. In the example shown in FIG. 7A, encoded data bits 700 include segment 1, segment 2, segment 3, segment N, and other segments of encoded data bits. The number of encoded data bits in each of the N segments is indicated by the stream code associated with encoded data bits 700, as described below with respect to FIGS. 7B-7C.

Figure 7B:
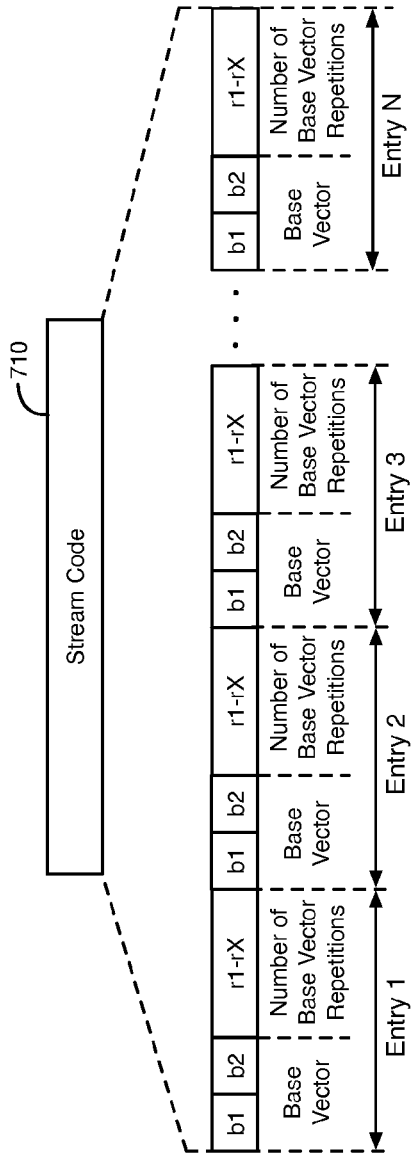
FIG. 7B illustrates an example of a stream code generated by an encoder that generates the encoded data bits of FIG. 7A, according to an embodiment of the present invention.

FIG. 7B illustrates an example of a stream code 710 generated by an encoder that generates the encoded data bits 700 of FIG. 7A, according to an embodiment of the present invention. The encoder may generate the stream code 710 using, for example, the algorithm described above with respect to FIG. 5.

Stream code 710 includes redundant bits that are used by a decoder to decode the encoded data bits 700 to regenerate the original data bits. Stream code 710 includes redundant bits that indicate the base vector selected in each iteration of operation 502. Stream code 710 also includes redundant bits that indicate the number of repetitions to apply the base vector in each segment as determined in each iteration of operation 503.

Stream code 710 is subdivided into an N number of entries. Each of the N entries in stream code 710 provides information for decoding the encoded data bits in a corresponding one of the N segments having the same number as the entry. Each of the entries in stream code 710 includes a base vector and a number of repetitions of the base vector to be applied to encoded data bits in the corresponding one of the N segments during decoding to regenerate a corresponding subset of the original data bits.

For example, entry 1 of stream code 710 includes a base vector indicated by bits b1 and b2 and a number of repetitions of the base vector indicated by bits r1-rX to be applied to the encoded data bits in segment 1 during decoding to regenerate a first subset of the original data bits. Bits r1-rX may have any suitable number of bits. For example, bits r1-rX may have a $\log_2(2/E)$ number of bits (i.e., $X=\log_2(2/E)$). E is the rate (or the approximate rate) of memory cells having stuck-at faults that is based on the error vectors. As an example, $E=1\times10^{-2}$, which corresponds to a rate of 1 memory cell having a stuck-at fault for every 100 memory cells on average.

Entry 2 of stream code 710 includes a base vector indicated by bits b1 and b2 and a number of repetitions of the base vector indicated by bits r1-rX to be applied to the encoded data bits in segment 2 during decoding to regenerate a second subset of the original data bits. Entry 3 of stream code 710 includes a base vector indicated by bits b1 and b2 and a number of repetitions of the base vector indicated by bits r1-rX to be applied to the encoded data bits in segment 3 during decoding to regenerate a third subset of the original data bits. Entry N of stream code 710 includes a base vector indicated by bits b1 and b2 and a number of repetitions of the base vector indicated by bits r1-rX to be applied to the encoded data bits in segment N during decoding to regenerate a last subset of the original data bits.

Figure 7C:
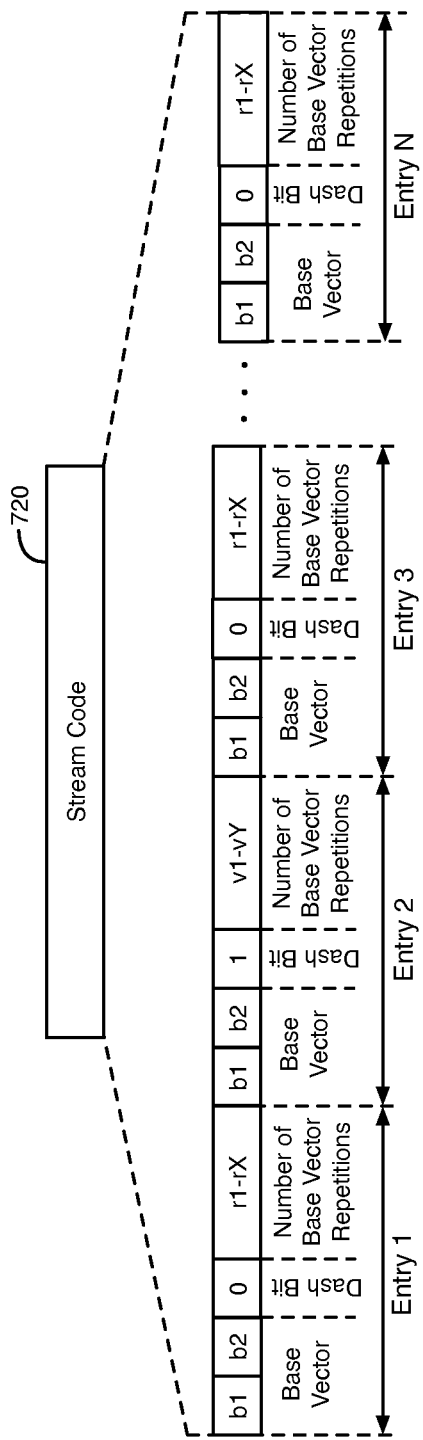
FIG. 7C illustrates an alternative example of a stream code generated by an encoder that generates the encoded data bits of FIG. 7A, according to an embodiment of the present invention.

FIG. 7C illustrates an alternative example of a stream code 720 generated by an encoder that generates the encoded data bits 700 of FIG. 7A, according to an embodiment of the present invention. In the embodiment of FIG. 7C, the encoder generates stream code 720 instead of stream code 710. The encoder may generate stream code 720 using, for example, the algorithm described above with respect to FIG. 5.

Stream code 720 includes redundant bits that are used by a decoder to decode the encoded data bits 700 to regenerate the original data bits. Stream code 720 includes redundant bits that indicate the base vector selected in each iteration of operation 502. Stream code 720 also includes redundant bits that indicate the number of repetitions to apply the base vector in each segment as determined in each iteration of operation 503. Stream code 720 also includes dash bits. Each of the dash bits indicates the number of bits that indicate the repetitions to apply the base vector in each segment.

Stream code 720 is subdivided into an N number of entries. Each of the N entries in stream code 720 provides information for decoding the encoded data bits in a corresponding one of the N segments having the same number as the entry. Each of the entries in stream code 720 includes a base vector as indicated by bits b1 and b2. Each of the entries in stream code 720 also includes a number of repetitions of the base vector b1 and b2 to be applied to encoded data bits in the corresponding one of the N segments during decoding to regenerate a corresponding subset of the original data bits. The number of repetitions of the base vector b1 and b2 is indicated by bits r1-rX or bits v1-vY.

Each of the entries in stream code 720 also includes a dash bit. The dash bit indicates the number of bits indicating the number of repetitions of the base vector to apply in the corresponding segment of encoded data bits. In the example of FIG. 7C, if the dash bit is 0, then a first number of bits r1-rX indicates the number of repetitions of the base vector. If the dash bit is 1, then a second number of bits v1-vY indicates the number of repetitions of the base vector. In an embodiment, v1-vY has a larger number of bits than r1-rX. As an example, bits r1-rX may have a $\log_2(2/E)$ number of bits (i.e., $X=\log_2(2/E)$), where E is the error rate of the memory cells, or a rounded error rate of the memory cells, that is based on the error vectors. Bits v1-vY may, for example, have a $\log_2 k$ number of bits, where k is the number of the original data bits. In this example, bits v1-vY have enough bits to potentially apply repetitions of one base vector to all of the data bits.

In FIG. 7C, entry 1 of stream code 720 includes a base vector indicated by bits b1 and b2, a dash bit that equals 0, and a number of repetitions of that base vector indicated by bits r1-rX to be applied to the encoded data bits in segment 1 during decoding to regenerate a first subset of the original data bits. Entry 2 of stream code 720 includes a base vector indicated by bits b1 and b2, a dash bit that equals 1, and a number of repetitions of that base vector indicated by bits v1-vY to be applied to the encoded data bits in segment 2 during decoding to regenerate a second subset of the original data bits. Entry 3 of stream code 720 includes a base vector indicated by bits b1 and b2, a dash bit that equals 0, and a number of repetitions of that base vector indicated by bits r1-rX to be applied to the encoded data bits in segment 3 during decoding to regenerate a third subset of the original data bits. Entry N of stream code 720 includes a base vector indicated by bits b1 and b2, a dash bit that equals 0, and a number of repetitions of that base vector indicated by bits r1-rX to be applied to the encoded data bits in segment N during decoding to regenerate a last subset of the original data bits.

Figure 8A:
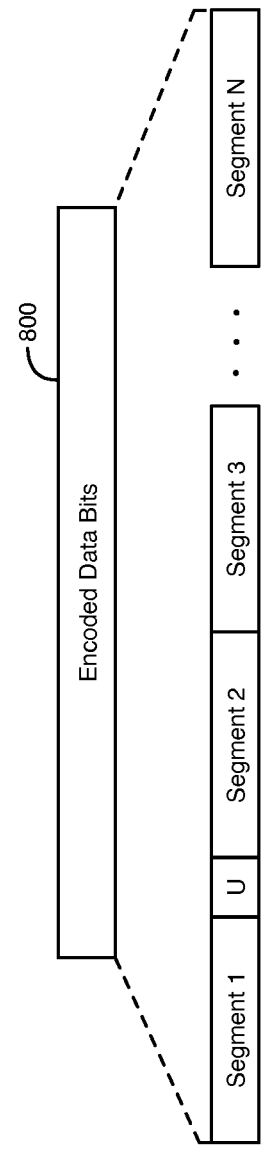
FIG. 8A illustrates another exemplary set of encoded data bits having segments, according to an embodiment of the present invention.

FIG. 8A illustrates another exemplary set of encoded data bits 800 having segments, according to an embodiment of the present invention. An encoder may generate the encoded data bits 800 using, for example, the algorithm described above with respect to FIG. 5.

Encoded data bits 800 include an N number of segments of encoded data bits. N may be any positive integer greater than 0. In the example shown in FIG. 8A, encoded data bits 800 include segment 1, segment 2, segment 3, segment N, and other segments of encoded data bits. In the example of FIG. 8A, one or two of encoded data bits 800 between segments 1 and 2 are provided for storage in memory cells having unstable values, as indicated by the U designation. The number of encoded data bits in each segment is indicated by the stream code associated with encoded data bits 800, as described below with respect to FIG. 8B.

FIG. 8B illustrates an example of a stream code 810 generated by an encoder that generates the encoded data bits 800 of FIG. 8A, according to an embodiment of the present invention. The encoder may generate the stream code 810 using, for example, the algorithm described above with respect to FIG. 5.

Stream code 810 includes redundant bits that are used by a decoder to decode the encoded data bits 800 to regenerate the original data bits. Stream code 810 includes redundant bits that indicate the base vector selected in each iteration of operation 502.

Stream code 810 also includes redundant bits that indicate the number of repetitions to apply that base vector in each segment as determined in each iteration of operation 503. Stream code 810 also includes dash bits. The dash bits are used as described above with respect to FIG. 7C. Stream code 810 also includes unstable bits. The unstable bits indicate memory cells that have unstable values. A memory cell with an unstable value cannot reliably store a digital 1 or 0.

The encoder generates one or more data sections in the stream code to compensate for memory cells having unstable values. Data bits that are provided for storage in memory cells having unstable values are stored in a data section of the stream code instead of being stored in the memory cells having unstable values. Each data section in a stream code stores one or more data bits that correspond to one or more memory cells having unstable values. Each data section includes at least one unstable bit and one or more of the data bits. The unstable bit identifies the one or more subsequent bits in the stream code as data bits that are to be copied into the decoded data bits by the decoder during the decoding process. Copying the data bits from the stream code into the decoded data bits during decoding ensures that those data bits are free of errors. Storing data bits corresponding to memory cells having unstable values in the stream code is particularly advantageous if the memory circuit has significantly less memory cells having unstable values compared to memory cells having stuck-at faults.

Stream code 810 is subdivided into N entries and one data section. Each of the N entries in stream code 810 provides information for decoding the encoded data bits in a corresponding one of the N segments having the same number as the entry. Each of the entries in stream code 810 includes a base vector as indicated by bits b1 and b2. Each of the entries in stream code 810 also includes a number of repetitions of the base vector b1 and b2 to be applied to encoded data bits in the corresponding one of the N segments during decoding to regenerate a corresponding subset of the original data bits.

Each of the entries in stream code 810 also includes a dash bit. The dash bit indicates the number of bits (r1-rX or v1-vY) indicating the number of repetitions to apply the base vector in that segment. The number of repetitions of the base vector b1 and b2 is indicated by bits r1-rX or bits v1-vY, as described above with respect to FIG. 7C.

Each of the entries and the data section in stream code 810 includes an unstable bit. In the example of FIG. 8B, the unstable bit in each entry is 0 when none of the memory cells where the encoded data bits in the corresponding segment are to be stored have unstable values. The unstable bit in the data section is 1 when a corresponding one of the memory cells has an unstable value. In the example of FIG. 8B, if a data bit is provided for storage in a memory cell having an unstable value, the digital value of that data bit and the digital value of the next data bit are stored in the stream code after an unstable bit value of 1.

In FIG. 8B, entry 1 of stream code 810 includes an unstable bit that equals 0, a base vector indicated by bits b1 and b2, a dash bit that equals 0, and a number of repetitions of that base vector indicated by bits r1-rX to be applied to the encoded data bits in segment 1 during decoding to regenerate a first subset of the original data bits. The data section of stream code 810 includes an unstable bit that equals 1 and two data bits d1 and d2. Data bits d1 and d2 are copied from the data section as decoded data bits during decoding. Entry 2 of stream code 810 includes an unstable bit that equals 0, a base vector indicated by bits b1 and b2, a dash bit that equals 1, and a number of repetitions of that base vector indicated by bits v1-vY to be applied to the encoded data bits in segment 2 during decoding to regenerate a third subset of the original data bits. Entry N of stream code 810 includes an unstable bit equal to 0, a base vector indicated by bits b1 and b2, a dash bit that equals 0, and a number of repetitions of that base vector indicated by bits r1-rX to be applied to the encoded data bits in segment N during decoding to regenerate a last subset of the original data bits.

According to some embodiments, each base vector is applied to data bits in discontinuous segments to generate encoded data bits that accommodate stuck-at faults in corresponding memory cells. As an example, a constraint can be used to generate a compact set of redundant bits in the stream code that causes the discontinuous segments to have the same length. According to this exemplary constraint, each set of two consecutive discontinuous segments are separated by the same number of bits, and the discontinuous segments span the whole data set length. FIG. 9A illustrates an example of encoded data bits 900 having discontinuous segments that are generated using this exemplary constraint, according to an embodiment of the present invention.

The encoded data bits 900 have consecutive bit positions that are numbered 0-F in FIG. 9A, where F is a non-zero positive integer. Each of the encoded data bits 900 has the same bit position as the data bit used to generate that encoded data bit. In the example of FIG. 9A, the encoded data bits 900 include three sets of segments. The first set of segments includes three discontinuous segments 1A, 1B, and 1C. The second set of segments includes three discontinuous segments 2A, 2B, and 2C. The third set of segments includes three discontinuous segments 3A, 3B, and 3C.

Figure 9B:
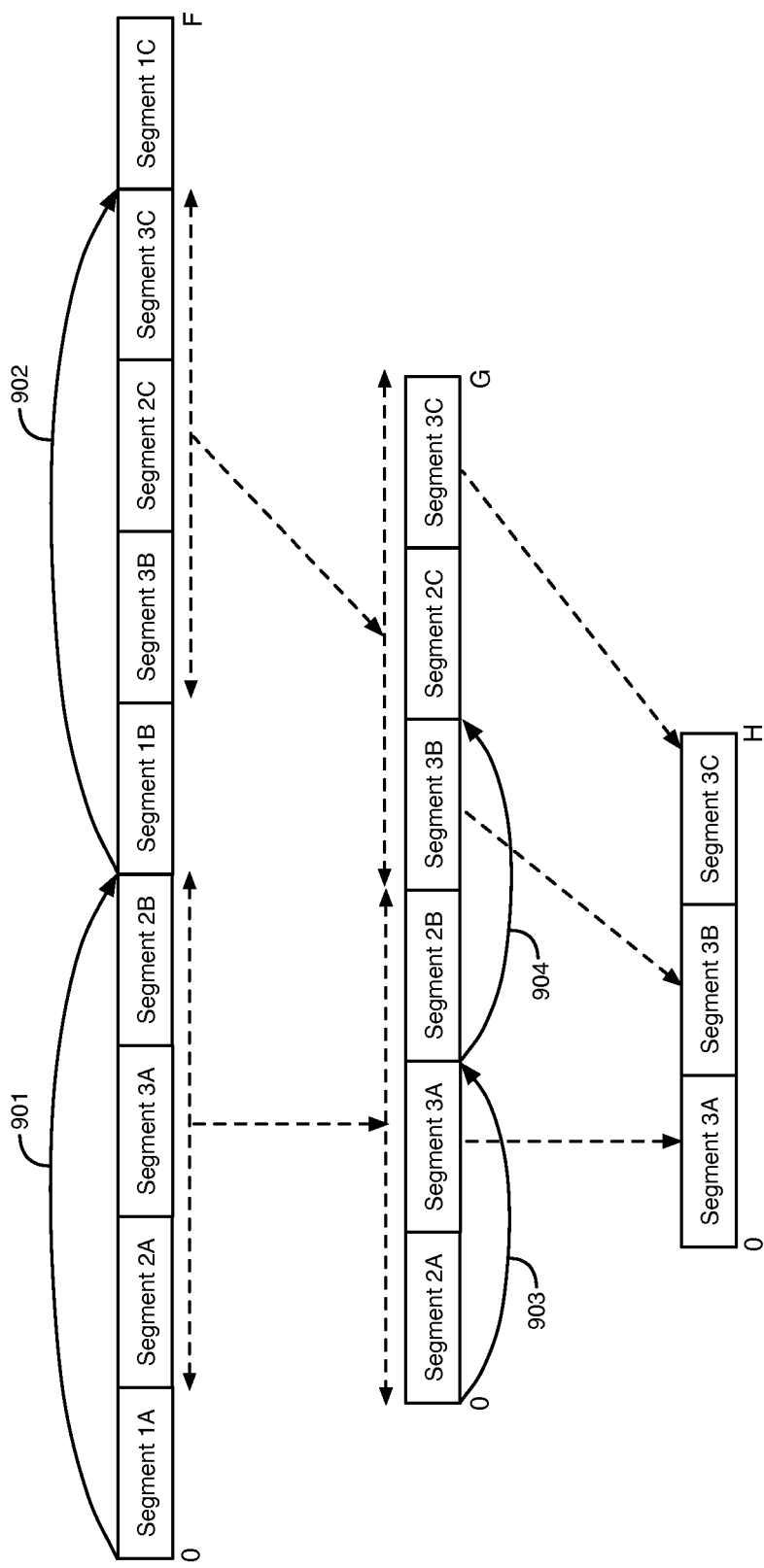
FIG. 9B illustrates additional details of the discontinuous segments of the encoded data bits shown in FIG. 9A.

FIG. 9B illustrates additional details of the discontinuous segments of the encoded data bits 900 shown in FIG. 9A. Initially, an encoder applies a first base vector to the data bits in three discontinuous segments during encoding to generate the encoded data bits in three discontinuous segments 1A-1C. The encoder generates redundant bits in a stream code that indicate the number of repetitions of the first base vector applied in each of the three discontinuous segments 1A-1C. The number of encoded data bits between the first bit in each of discontinuous segments 1A and 1B, as shown by arrow 901, equals the number of encoded data bits between the first bit in each of discontinuous segments 1B and 1C, as shown by arrow 902. The encoder also generates discontinuous pointer bits in the stream code that indicate the number of encoded data bits between the first bits in each pair of consecutive segments in the set of discontinuous segments 1A-1C.

Then, the data bits that have not yet been encoded are reorganized as a new continuous data set with consecutive bit positions that are renumbered 0-G, as shown in FIG. 9B, where G is a non-zero positive integer that is less than F. The encoder applies a second base vector to the data bits in three discontinuous segments during encoding to generate the encoded data bits in three discontinuous segments 2A-2C. The encoder generates redundant bits in the stream code that indicate the number of repetitions of the second base vector applied in each of the three discontinuous segments 2A-2C. The number of encoded data bits between the first bit in each of discontinuous segments 2A and 2B, as shown by arrow 903, equals the number of encoded data bits between the first bit in each of discontinuous segments 2B and 2C, as shown by arrow 904. The encoder also generates discontinuous pointer bits in the stream code that indicate the number of encoded data bits between the first bits in each pair of consecutive segments in the set of discontinuous segments 2A-2C.

Subsequently, the data bits that have not yet been encoded are reorganized as a new continuous data set with consecutive bit positions that are renumbered 0-H, as shown in FIG. 9B, where H is a non-zero positive integer that is less than G. The encoder applies a third base vector to the data bits in three segments during encoding to generate the encoded data bits in three segments 3A-3C. Segments 3A-3C are discontinuous with respect to the original bit positions numbered 0-F. The encoder generates redundant bits in the stream code that indicate the number of repetitions of the third base vector applied in the three segments 3A-3C.

Figure 9C:
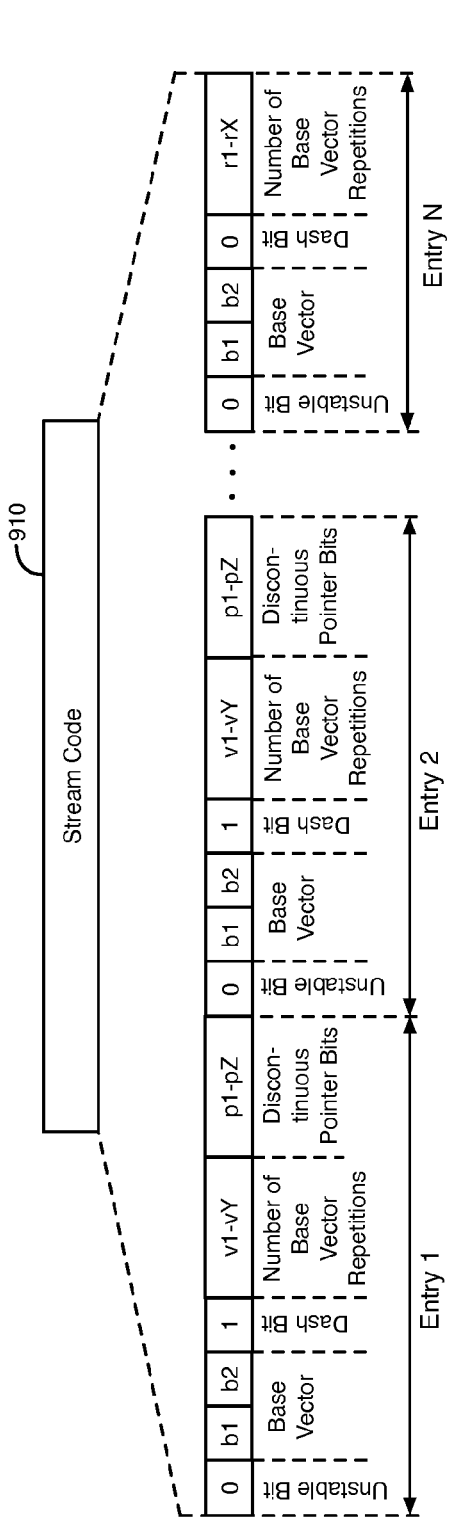
FIG. 9C illustrates an example of a stream code generated by an encoder that generates the encoded data bits of FIG. 9A, according to an embodiment of the present invention.

FIG. 9C illustrates an example of a stream code 910 generated by the encoder that generates the encoded data bits 900 of FIG. 9A, according to an embodiment of the present invention. The encoder may generate the stream code 910 using, for example, the algorithm described above with respect to FIG. 5.

Stream code 910 includes redundant bits that are used by a decoder to decode the encoded data bits 900 to regenerate the original data bits. The redundant bits in stream code 910 indicate the base vector selected in each iteration of operation 502 and the number of repetitions to apply the base vector to each of the segments as determined in each iteration of operation 503. Stream code 910 also includes dash bits, as described above with respect to FIG. 7C. Stream code 910 also includes unstable bits, as described above with respect to FIG. 8B.

The encoded data bits 900 are subdivided into discontinuous segments of encoded data bits that are separated by other encoded data bits, as described above with respect to FIG. 9A. Stream code 910 further includes discontinuous pointer bits that indicate the number of encoded data bits between the first bits in each pair of consecutive segments in each set of discontinuous segments, as described above with respect to FIG. 9A.

Stream code 910 is subdivided into an N number of entries. Each of the N entries in stream code 910 provides information for decoding the encoded data bits in the segments in a corresponding set of discontinuous segments having the same number as the entry. Each of the entries in stream code 910 includes a base vector and a number of repetitions of the base vector to be applied to the encoded data bits in each of the segments in the corresponding set of discontinuous segments during decoding to regenerate a subset of the original data bits. Each of the entries in stream code 910 also includes an unstable bit and a dash bit. If the dash bit equals 1 in an entry, then that entry also includes a set of discontinuous pointer bits.

In FIG. 9C, entry 1 of stream code 910 includes an unstable bit that equals 0, a base vector indicated by bits b1 and b2, and a dash bit that equals 1. Entry 1 of stream code 910 also includes a number of repetitions of that base vector as indicated by bits v1-vY to be applied to the encoded data bits in each of the segments (e.g., segments 1A-1C) in the first set of discontinuous segments during decoding to regenerate a first subset of the original data bits. Entry 1 of stream code 910 also includes discontinuous pointer bits p1-pZ. The discontinuous pointer bits p1-pZ in entry 1 indicate the number of encoded data bits between the first bits in each pair of consecutive segments in the first set of discontinuous segments.

In FIG. 9C, entry 2 of stream code 910 includes an unstable bit that equals 0, a base vector indicated by bits b1 and b2, and a dash bit that equals 1. Entry 2 of stream code 910 also includes a number of repetitions of that base vector as indicated by bits v1-vY to be applied to the encoded data bits in each of the segments (e.g., segments 2A-2C) in the second set of discontinuous segments during decoding to regenerate a second subset of the original data bits. Entry 2 of stream code 910 also includes discontinuous pointer bits p1-pZ. The discontinuous pointer bits p1-pZ in entry 2 indicate the number of encoded data bits between the first bits in each pair of consecutive segments in the second set of discontinuous segments. The first set of discontinuous segments are ignored by the decoder when using the discontinuous pointer bits p1-pZ in entry 2 to count the number of encoded data bits between the first bits in each pair of consecutive segments in the second set of discontinuous segments.

In FIG. 9C, the last entry N of stream code 910 includes an unstable bit that equals 0, a base vector indicated by bits b1 and b2, a dash bit that equals 0, and a number of repetitions of that base vector as indicated by bits r1-rX to be applied to the encoded data bits in each of the segments (e.g., segments 3A-3C) in the last set of discontinuous segments during decoding to regenerate the last subset of the original data bits. Because the last entry N of stream code 910 does not include discontinuous pointer bits, the decoder applies the base vector indicated by bits b1 and b2 in entry N in continuous repetitions to the encoded data bits at the renumbered and numerically consecutive bit positions of the last set of discontinuous segments. The encoder does not apply the base vector indicated in the last entry N to the previous sets of discontinuous segments. The decoding process terminates after the last entry N is processed.

Figure 9D:
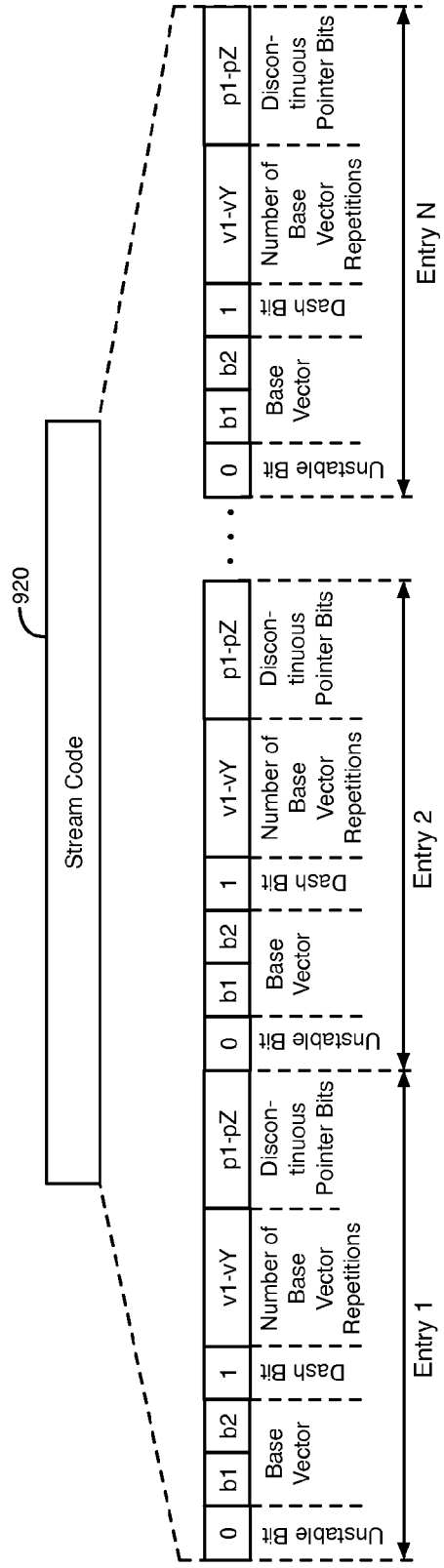
FIG. 9D illustrates another example of a stream code generated by an encoder that generates the encoded data bits of FIG. 9A, according to an embodiment of the present invention.

FIG. 9D illustrates another example of a stream code 920 generated by an encoder that generates the encoded data bits 900 of FIG. 9A, according to an embodiment of the present invention. The encoder may generate the stream code 920 using, for example, the algorithm described above with respect to FIG. 5.

Stream code 920 includes redundant bits that are used by a decoder to decode the encoded data bits 900 to regenerate the original data bits. The redundant bits in stream code 920 indicate the base vector selected in each iteration of operation 502 and the number of repetitions to apply the base vector to each of the segments as determined in each iteration of operation 503. Stream code 920 also includes dash bits, as described above with respect to FIG. 7C. Stream code 920 also includes unstable bits, as described above with respect to FIG. 8B. Stream code 920 further includes discontinuous pointer bits that indicate the number of encoded data bits between the first bits in consecutive pairs of the segments in each set of the discontinuous segments.

Stream code 920 is subdivided into an N number of entries. Each of the N entries in stream code 920 provides information for decoding the encoded data bits in the segments in the corresponding set of discontinuous segments having the same number as the entry. Each of the entries in stream code 920 includes an unstable bit, a base vector, a number of repetitions of the base vector to be applied to encoded data bits in each of the segments in the corresponding set of discontinuous segments during decoding to regenerate a subset of the original data bits, a dash bit, and discontinuous pointer bits.

In FIG. 9D, entry 1 through entry (N−1) of stream code 920 include the same bits that are described above with respect to entry 1 through entry (N−1) in FIG. 9C. The last entry N of stream code 920 includes an unstable bit that equals 0, a base vector indicated by bits b1 and b2, a dash bit that equals 1, and a number of repetitions (as indicated by bits v1-vY) of that base vector to be applied to the encoded data bits in each segment in the last set of discontinuous segments during decoding to regenerate the last subset of the original data bits. Entry N of stream code 920 also includes discontinuous pointer bits p1-pZ that equal the number of bits in each segment in the last set of discontinuous segments to indicate to the decoder that the renumbered bit positions of the last set of discontinuous segments are numerically consecutive. Therefore, the decoder applies the base vector indicated by bits b1 and b2 in entry N to the encoded data bits in the last set of discontinuous segments in continuous repetitions. The decoding process terminates after the last entry N is processed.

According to some embodiments, the encoder can select one of multiple encoding techniques to apply to a set of data bits to generate encoded data bits based on the error rate of stuck-at faults and unstable values in the corresponding memory cells. The encoding technique selected by the encoder is then provided to the decoder. For example, the encoder may select among the encoding techniques described herein with respect to FIG. 5, 6A-6D, 7A-7C, 8A-8B, 9A-9D, 10A, 11A-11D, 12A-12C, 13, 14A-14C, or 15.

The redundant bits, such as the stream codes, discussed herein are stored in memory after encoding, then read from memory and provided to the decoder during decoding. According to some embodiments, the redundant bits, including the stream codes, that are provided to the decoder do not contain errors. Error correction codes may be applied to the stream codes so that the streams codes are error-free. For example, an error correction code (ECC) wrap around the stream code protects the stream code from memory cells having unstable values and random errors if the stream code is saved in error-prone phase change memory cells. As another example, the stream code may be stored in DRAM, and be only prone to random errors typical of DRAM cells with correction of errors by an ECC technique for memory.

Some memory cells in the memory circuit may be categorized as having stuck-at faults or as having unstable values based on a smaller number of writes and reads to these memory cells. In some instances, random errors at the time of those writes and reads may cause one or more memory cells to be incorrectly indicated as having a stuck-at fault or an unstable value. According to some embodiments, a global ECC wrap is added to both the encoded data bits and the stream code to protect against the potential incorrect categorization of some memory cells as having stuck-at faults or unstable values.

FIG. 10A is a flow chart that illustrates another example of a process for encoding data bits to generate encoded data bits and redundant bits for accommodating memory cells having stuck-at faults, according to an embodiment of the present invention. The encoded data bits are stored in memory cells that may have stuck-at faults. The addresses of the memory cells with stuck-at faults and the digital values of the stuck-at faults are known prior to performing the operations shown in FIG. 10A. The operations of FIG. 10A are performed instead of storing the data bits in the memory cells. The operations of FIG. 10A may, for example, be performed by control circuit 101.

Prior to operation 1001, each of the data bits is assigned to a corresponding memory cell in the memory circuit. Some of these memory cells may have stuck-at faults. If some of the memory cells assigned to the data bits have known stuck-at faults, an encoder compares these data bits to the digital values of the corresponding stuck-at faults to determine which of these data bits have the same digital values as their corresponding stuck-at faults and which of these data bits do not have the same digital values as their corresponding stuck-at faults in operation 1001.

In operation 1002, the encoder encodes the data bits to generate encoded data bits and redundant bits using, for example, one of the encoding algorithms described herein. In operation 1002, the digital values of the data bits that do not match their corresponding stuck-at faults are inverted to generate corresponding ones of the encoded data bits. In operation 1002, the digital values of the data bits that match their corresponding stuck-at faults are not inverted to generate corresponding ones of the encoded data bits. The redundant bits may, for example, include a stream code, as described above. As another example, the redundant bits may include index bits, as described below. In operation 1003, the encoded data bits are stored in their corresponding memory cells. The redundant bits are also stored in memory. The encoded data bits and the redundant bits may be stored in the same memory device or in different memory devices.

FIG. 10B is a flow chart that illustrates an example of a process for decoding the encoded data bits generated in the process of FIG. 10A to regenerate the data bits using the redundant bits, according to an embodiment of the present invention. In operation 1011, the encoded data bits and the redundant bits are read from memory. In operation 1012, the decoder applies a decoding algorithm to the encoded data bits to regenerate the data bits using the redundant bits. The decoder may, for example, apply one of the decoding algorithms described herein. The redundant bits indicate to the decoder which of the encoded data bits to invert and which of the encoded data bits not to invert to regenerate the data bits. The encoding and decoding algorithms of FIGS. 10A-10B may, for example, be performed by control circuit 101 or by control circuits in either of memory circuits 102-103.

Figure 11D:
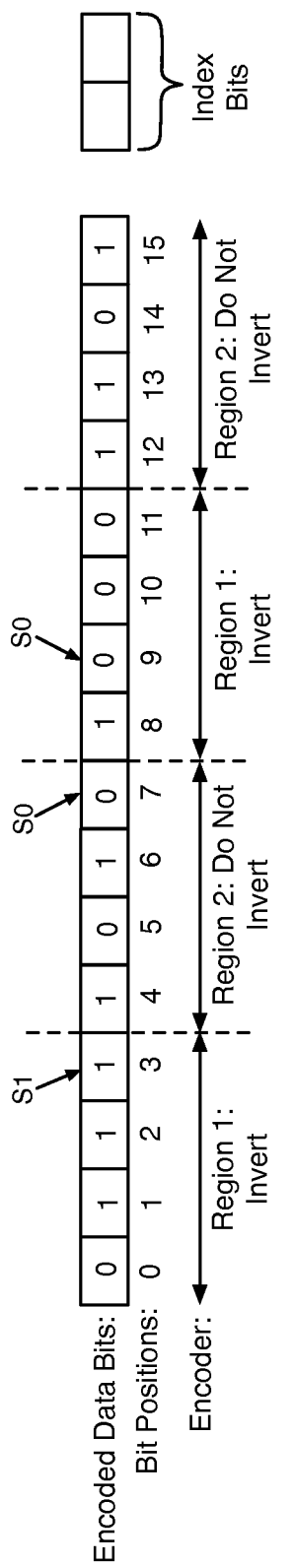
FIG. 11D illustrates another exemplary application of an encoding technique that encodes data bits by changing data bits in regions, according to an embodiment of the present invention.

FIG. 11A illustrates an example of data bits that are provided for storage in memory cells having stuck-at faults, according to an embodiment of the present invention. FIG. 11A illustrates 16 data bits having bit positions numbered 0-15 as an example. Examples of the digital values of the 16 data bits are shown inside the 16 boxes in FIG. 11A. The 16 data bits are provided for storage in 16 corresponding memory cells. The bit position of each data bit is shown below that data bit in FIG. 11A. In the example of FIG. 11A, the data bits at bit positions 3, 7, and 9 are provided for storage in memory cells having stuck-at faults. The addresses of the memory cells with stuck-at faults and the digital values of the stuck-at faults are known prior to encoding. The data bit at bit position 3 is provided for storage in a memory cell that is stuck-at 1, and the data bits at bit positions 7 and 9 are provided for storage in memory cells that are stuck-at 0. In FIGS. 11A-11D, the stuck-at 1 faults are identified as S1, and the stuck-at 0 faults are identified as S0.

An encoder compares the digital values of the data bits to the digital values of the stuck-at faults of the corresponding memory cells, as described above with respect to operation 1001. The encoder determines which data bits have the same digital values as their corresponding stuck-at faults and which data bits have different digital values than their corresponding stuck-at faults. The encoder then inverts the data bits having digital values that do not match their corresponding stuck-at faults to generate encoded data bits. The encoder also generates index bits that indicate the bit positions of the inverted data bits. The index bits described herein are redundant bits.

FIG. 11B illustrates an exemplary application of an encoding technique that encodes data bits by only changing the data bits having digital values that do not match the digital values of the stuck-at faults of the corresponding memory cells, according to an embodiment of the present invention. The example of FIG. 11B uses the same data bits, stuck-at faults, and bit positions shown in FIG. 11A. As shown in FIG. 11A, the data bit at bit position 3 has a digital value of 0, but the corresponding memory cell at bit position 3 is stuck-at 1. Therefore, an encoder inverts the digital value of the data bit to be stored in that memory cell from 0 to 1, as indicated by an I at bit position 3 in FIG. 11B, when generating the corresponding encoded data bit. The data bit at bit position 9 has a digital value of 1, but the corresponding memory cell at bit position 9 is stuck-at 0. Therefore, the encoder inverts the digital value of the data bit to be stored in that memory cell from 1 to 0, as indicated by an I at bit position 9 in FIG. 11B, when generating the corresponding encoded data bit.

As shown in FIG. 11A, the data bit at bit position 7 has a digital value of 0, and the corresponding memory cell at bit position 7 is stuck-at 0. Therefore, the encoder does not invert the digital value of the data bit to be stored in that memory cell, as indicated by the C at bit position 7 in FIG. 11B, when generating the corresponding encoded data bit. In the embodiment of FIG. 11B, the encoder only evaluates the data bits to be stored in memory cells with known stuck-at faults. Thus, in the embodiment of FIG. 11B, the encoder does not change the digital values of the data bits that are provided for storage in memory cells not having known stuck-at faults when the encoder generates the corresponding encoded data bits.

The encoder also generates index bits as shown in FIG. 11B. In the embodiment of FIG. 11B, the index bits indicate the bit position of each of the encoded data bits that is stored in a memory cell having a stuck-at fault. A decoder uses the index bits to decode the encoded data bits to regenerate the original data bits. The bit position of each data bit can be described by $\log_2 k$ bits, where k is the number of data bits, as shown in equation (1) below. In equation (1), i is an index value, e refers to the $i^{th}$ stuck-at fault, each b' is an index bit, and s is the number of stuck-at faults where a subset of the encoded data bits are stored in memory. Thus, equation (1) indicates the number of index bits needed to describe the bit position of each stuck-at fault.

$$e_i = b_{\log k-1}{}^i \ldots b_1{}^i b_0{}^i \text{ where } i \in \{0, \ldots, s-1\} \quad (1)$$

In the embodiment of FIG. 11B, the index bits have $\log_2 k$ bits for storing the bit position of each memory cell having a stuck-at fault. Thus, an $s(\log_2 k)$ number of index bits are used in the embodiment of FIG. 11B to store the bit positions of the memory cells having stuck-at faults where encoded data bits are stored.

Also, an additional s number of index bits are added to the index to indicate whether each of the encoded data bits stored in a memory cell having a stuck-at fault was inverted or not inverted relative to the corresponding original data bit. As an example that is not intended to be limiting, a 1 bit may be stored in the index bits for each encoded data bit that was inverted relative to an original data bit before being stored in a memory cell having a stuck-at fault, and a 0 bit may be stored in the index bits for each encoded data bit that was not inverted relative to an original data bit before being stored in a memory cell having a stuck-at fault.

An advantage of allocating index bits that provide an exact description of the bit positions of all the s stuck-at fault bit positions and s additional index bits is that the bit positions and the digital values of the stuck-at faults do not need to be determined prior to encoding each set of data bits. For example, operations 201-208 shown in FIG. 2 do not need to be performed prior to encoding every set of data bits, even after many write cycles, because the accrual of stuck-at faults in the memory circuit is assumed to be slow. The two additional physical write operations 201 and 205 in FIG. 2 may consume a significant amount of time. By not performing operations 201-208, the encoding process can be performed in substantially less time. An additional error correction scheme (e.g., using parity check bits) can be applied to the data bits to detect when a new stuck-at fault occurs. Operations 201-208 only need to be performed when the error correction scheme detects a new stuck-at fault in the memory cells.

A total of $s(\log_2 k)+s$ index bits are stored in the index to represent the digital values and the bit positions of the encoded data bits that are stored in memory cells having stuck-at faults. Equation (2) below represents the lower bound on the number of index bits $b_{MIN}$ that can be used to represent the digital values and bit positions of the encoded data bits that are stored in memory cells having stuck-at faults using the encoding technique described with respect to FIG. 11B.

$$b_{MIN} = \log_2 \binom{k}{s} + s \quad (2)$$

FIG. 11C illustrates an example application of an encoding technique that encodes data bits by changing data bits in regions, according to an embodiment of the present invention. In this embodiment, each region includes data bits provided for storage in memory cells having one or more stuck-at faults. If a region has multiple memory cells with stuck-at faults, then all of the stuck-at faults in that region either have the same digital values as their corresponding data bits, or all of the stuck-at faults in that region have the opposite digital values as their corresponding data bits. Each region includes data bits having consecutive or non-consecutive bit positions.

The data bits as shown in FIG. 11A include a data bit at bit position 3 having a 0 digital value that is provided for storage in a memory cell having a stuck-at 1 fault. In this embodiment, the encoder inverts each of the 6 data bits in region 1 from bit positions 0 to 5, as shown in FIG. 11C, to generate a first set of encoded data bits. Thus, the encoded data bit at bit position 3 is inverted to a digital value of 1 for storage in the memory cell having the stuck-at 1 fault. The data bits as shown in FIG. 11A include a data bit at bit position 7 having a 0 digital value that is provided for storage in a memory cell that is stuck-at 0. The encoder does not invert any of the 3 data bits in region 2 from bit positions 6 to 8, as shown in FIG. 11C, to generate a second set of encoded data bits. Thus, the encoded data bit at bit position 7 remains at a digital value of 0 for storage in the memory cell having the stuck-at 0 fault. The data bits as shown in FIG. 11A include a data bit at bit position 9 having a 1 digital value that is provided for storage in a memory cell that is stuck-at 0. The encoder inverts each of the 7 data bits in region 3 from bit positions 9 to 15, as shown in FIG. 11C, to generate a third set of encoded data bits. Thus, the encoded data bit at bit position 9 is inverted to a digital value of 0 for storage in the memory cell having the stuck-at 0 fault.

FIG. 11D illustrates another example application of an encoding technique that encodes data bits by changing data bits in regions, according to an embodiment of the present invention. In the embodiment of FIG. 11D, each region includes data bits provided for storage in memory cells with one or more stuck-at faults. If a region has multiple memory cells with stuck-at faults, then all of the stuck-at faults in the region either have the same digital values as their corresponding data bits, or all of the stuck-at faults in the region have the opposite digital values as their corresponding data bits. Each region includes data bits having consecutive or non-consecutive bit positions.

In the embodiment of FIG. 11D, an encoder compares the digital value of each stuck-at fault within a set of memory cells to the digital value of the data bit provided for storage in the memory cell having that stuck-at fault. The encoder determines which of the data bits to invert and which of the data bits not to invert to generate encoded data bits that match the digital values of the corresponding stuck-at faults. The encoded data bits are stored in the memory cells.

The encoder then compares the binary values of the bit positions of the data bits provided for storage in the memory cells having the stuck-at faults bit-by-bit from their most significant bits to their least significant bits. The encoder selects the most significant bit location in these bit positions such that the bits at that bit location in the bit positions of data bits that are inverted have a first digital value and the bits at that bit location in the bit positions of data bits that are not inverted have a second digital value. The bits at the selected bit location are then used to define multiple regions. All of the data bits in each of the regions are inverted or not inverted to generate encoded data bits for that region. Each of the regions corresponds to memory cells having one or more stuck-at faults, and the stuck-at faults in each region have the same orientation with respect to their corresponding data bits. That is, the stuck-at faults in a region either have the same digital values as their corresponding data bits or the opposite digital values as their corresponding data bits. The encoded data bits for the regions are then stored in the corresponding memory cells.

FIG. 11D illustrates an example of encoded data bits that have been generated using this encoding technique. In the example shown in FIG. 11D, the encoder uses the same data bits, stuck-at faults, and bit positions that are shown in FIG. 11A. Table 1 below illustrates the binary values of the bit positions of the data bits provided for storage in corresponding memory cells that have stuck-at faults, in the example of FIG. 11A. Errors $e_0$, $e_1$, and $e_2$ are the stuck-at faults shown in FIG. 11A at bit positions 3, 7, and 9, respectively.

TABLE 1

| | Binary Bit Position | | | |
|---|---|---|---|---|
| $e_0$ | 0 | 0 | 1 | 1 |
| $e_1$ | 0 | 1 | 1 | 1 |
| $e_2$ | 1 | 0 | 0 | 1 |
| Bit location | $b_{11}$ | $b_{10}$ | $b_{01}$ | $b_{00}$ |

As discussed above, the data bits at bit positions 3 and 9 need to be inverted to match the digital values of their corresponding stuck-at faults, and the data bit at bit position 7 does not need to be inverted to match the digital value of its corresponding stuck-at fault. As shown in Table 1, the bit location $b_{10}$ is the most significant bit location among the bit positions of errors $e_0$, $e_1$, and $e_2$ that has the same digital value (i.e., 0) for errors $e_0$ and $e_2$ and a different digital value (i.e., 1) for error $e_1$. Therefore, the encoder selects bit location $b_{10}$.

In this example, the encoder creates two regions among the 16 data bits based on the digital value of the selected bit location $b_{10}$ in each of the bit positions for errors $e_0$, $e_1$, and $e_2$. During encoding, the encoder inverts the data bits that have bits at bit location $b_{10}$ in their bit positions equal to 0, and the encoder does not invert the data bits that have bits at bit location $b_{10}$ in their bit positions equal to 1. Thus, in this example, the encoder inverts the data bits having bit positions 0-3 and 8-11 (region 1), but does not invert the data bits having bit positions 4-7 and 12-15 (region 2) to generate encoded data bits that are stored in memory cells at these corresponding bit positions.

Each bit location in the bit position of a k number of data bits can be characterized by a $\log_2 \log_2 k$ number of bits. At least $\log_2 \log_2 k$ bits are used for the index bits in the encoding technique of FIG. 11D to indicate the selected bit location of the bit positions used to create the regions in which the data bits are inverted or not inverted to generate the encoded data bits, as described above. The maximum number of index bits $b_{MAX}$ that are used to encode and decode data bits using the embodiment described with respect to FIG. 11D is based on equations (3) and (4) below, in which a is the bit error rate of stuck-at faults in the memory cells, s is the number of stuck-at faults in the memory cells, and k is the number of data bits. The encoding technique of FIG. 11D may use less index bits than the encoding technique of FIG. 11B for data bits having a large number of stuck-at faults.

$$b_{MAX} = (3s-1) + (s-1)\log_2 \log_2 k \quad (3)$$

$$b_{MAX} = 4s + (1-\alpha)s \log_2 \log_2 \frac{1}{\alpha} \quad (4)$$

According to another embodiment, an encoder encodes data bits using a binary tree algorithm to generate encoded data bits that accommodate stuck-at faults in memory cells. The encoded data bits are stored in the memory cells. Subsequently, the encoded data bits are read from the memory cells and decoded using the binary tree algorithm to regenerate the original data bits. Exemplary code of a binary tree algorithm that can be used to build a binary tree according to this embodiment is provided below.

```
BinaryTreeAlgorithm(S)
Given S = {e_0, ..., e_{S-1}}
if (S has elements of the same type)
    then record the type in the current node of the binary tree
    return                //no children generated for current node
else
    select b_i such that:    //split on bit b_i
        S' = {e_j | b^i_j = 0} is non-empty and
        S" = {e_j | b^i_j = 1} is non-empty
    record b_i in the current node of the binary tree (using log_2log_2k bits)
    left child = BinaryTreeAlgorithm(S')
    right child = BinaryTreeAlgorithm(S")
```

In the exemplary binary tree algorithm provided above, k is the number of data bits provided for storage in memory cells having known stuck-at faults, S refers to a set of stuck-at faults in the memory cells, the stuck-at faults in the set S are referred to as $\{e_0, \ldots, e_{s-1}\}$, each $b_i$ refers to a node in the binary tree, i is a number that references the nodes, and j is a number that references each of the stuck-at faults in the set S. Each bit $b_i$ indicates a bit location within the binary bit positions of the data bits, as described above.

The exemplary binary tree algorithm provided above is processed to create a binary tree that indicates to an encoder how to encode data bits to accommodate known stuck-at faults in corresponding memory cells. An iteration of the binary tree algorithm is processed for each node in the binary tree. In the first iteration of the binary tree algorithm, all of the known stuck-at faults in the memory cells are processed as being in the first node of the binary tree.

The binary tree algorithm above is used to create a binary tree having nodes where each node of the binary tree has either 0 or 2 children. A node that has no children is a leaf. A node that has 2 children is an internal node. The number of leaves of the binary tree is at most s=|S|. If n is the number of internal nodes in the binary tree, then the binary tree has n+1 leaves. If the "if" branch of the binary tree algorithm above is processed, then 0 children are generated for the current node of the binary tree. If the "else" branch of the binary tree algorithm above is processed, then 2 children are generated for the current node of the binary tree. The binary tree algorithm above is then repeated for each of the children of the binary tree from left to right per row of children. Each node of the binary tree has a set of one or more stuck-at faults.

The "if" branch of the binary tree algorithm above is processed if the set S of stuck-at faults has elements of the same type. Set S has elements of the same type if all of the stuck-at faults in the set S have digital values that match the digital values of the corresponding data bits provided for storage in the memory cells having those stuck-at faults, or if all of the stuck-at faults in the set S have digital values that match the inverted digital values of the corresponding data bits provided for storage in the memory cells having those stuck-at faults.

The "else" branch of the binary tree algorithm above is processed if the set S of stuck-at faults has at least two elements that are not of the same type. S has elements that are not of the same type if a first one of the stuck-at faults in the set S has a digital value that matches the digital value of the corresponding data bit provided for storage in the memory cell having the first one of the stuck-at faults, and a second one of the stuck-at faults in the set S has a digital value that does not match the digital value of the corresponding data bit provided for storage in the memory cell having the second one of the stuck-at faults. Thus, if set S has elements that are not of the same type, then the encoder inverts at least one of the data bits corresponding to one stuck-at fault in the set S and does not invert at least one of the data bits corresponding to another stuck-at fault in the set S. In the "else" branch of the binary tree algorithm above, a bit $b_i$ is selected for the current node of the binary tree such that the current node has a left child and a right child. The left child of the current node includes all of the stuck-at faults $e_j$ in the set S in which that bit $b'_i$ equals 0 and is a non-empty set. The right child of the current node includes all of the stuck-at faults $e_j$ in the set S in which that bit $b'_i$ equals 1 and is a non-empty set. The binary tree algorithm is then repeated once for the right child and once for the left child. Each of the right child and the left child is a leaf of the binary tree if it contains stuck-at faults of the same type and an internal node of the binary tree if it contains stuck-at faults of different types.

Based on results from succinct data structures, a binary tree can be constructed with at most $(2s-1)$ bits using the binary tree algorithm provided above. According to some embodiments, the number of index bits generated by an encoder using the binary tree algorithm provided above equals $(2s-1)+s(\log_2 \log_2 k+1)$, where s is the number of stuck-at faults in the memory cells.

Figure 12A:
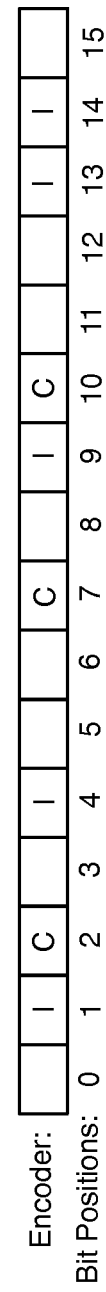
FIGS. 12A-12C illustrate examples of how a binary tree algorithm can be used to encode data bits provided for storage in memory cells having stuck-at faults to generate encoded data bits and index bits, according to embodiments of the present invention.
Figure 12B:
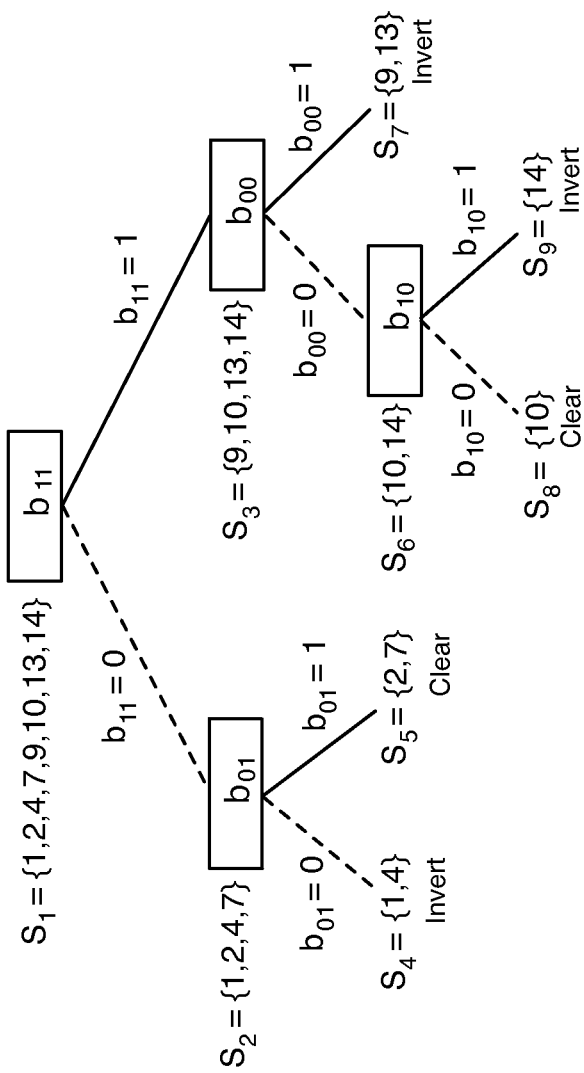
Figure 12C:
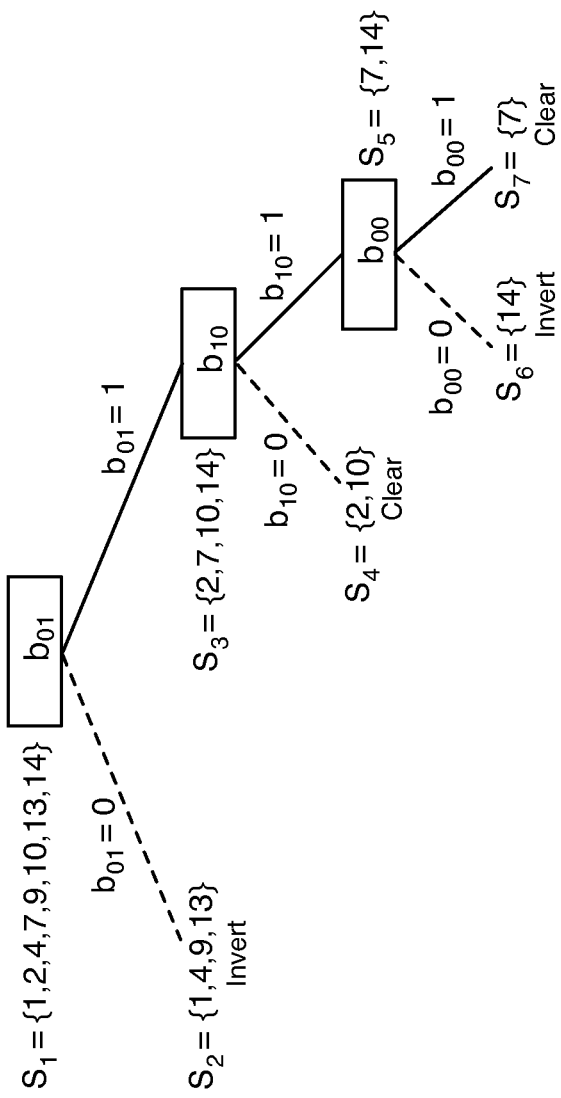

FIGS. 12A-12C illustrate examples of how the binary tree algorithm described above can be used to encode data bits provided for storage in memory cells having stuck-at faults to generate encoded data bits and index bits, according to embodiments of the present invention. FIG. 12A illustrates exemplary encoding information for 16 data bits that are provided for storage in memory cells having bit positions numbered 0-15. 8 of these 16 memory cells have stuck-at faults that are known prior to encoding.

The data bits provided for storage in the memory cells having bit positions 1, 4, 9, 13, and 14 do not have the same digital values as their corresponding at-stuck faults. The encoder inverts the digital values of these 5 data bits prior to storage to generate 5 encoded data bits, as indicated by each I in FIG. 12A, so that the inverted digital values of these 5 encoded data bits match the digital values of the stuck-at faults of the corresponding memory cells that these encoded data bits are stored in.

The data bits provided for storage in the memory cells having bit positions 2, 7, and 10 have the same digital values as their corresponding at-stuck faults. The encoder does not invert the digital values of these 3 data bits prior to storage to generate 3 encoded data bits, as indicated by each C in FIG. 12A, so that the digital values of these encoded data bits match the digital values of the stuck-at faults of the corresponding memory cells that these encoded data bits are stored in. The bit positions of the 8 data bits provided for storage in memory cells having stuck-at faults are shown in Table 2 below. The last row of Table 2 indicates the bit locations $b_i$ of each bit of the binary bit positions of these 8 data bits. Bits $b_i$ are the nodes of a binary tree generated using the binary tree algorithm above.

TABLE 2

| Stuck-At Fault | Decimal Bit Positions | Binary Bit Positions | | | |
|---|---|---|---|---|---|
| $e_0$ | 1 | 0 | 0 | 0 | 1 |
| $e_1$ | 2 | 0 | 0 | 1 | 0 |
| $e_2$ | 4 | 0 | 1 | 0 | 0 |
| $e_3$ | 7 | 0 | 1 | 1 | 1 |
| $e_4$ | 9 | 1 | 0 | 0 | 1 |
| $e_5$ | 10 | 1 | 0 | 1 | 0 |
| $e_6$ | 13 | 1 | 1 | 0 | 1 |
| $e_7$ | 14 | 1 | 1 | 1 | 0 |
| Node of binary tree/ Bit location | | $b_{11}$ | $b_{10}$ | $b_{01}$ | $b_{00}$ |

FIG. 12B illustrates an example of a binary tree that is generated using the binary tree algorithm described above and the exemplary encoding information shown in FIG. 12A. The binary tree of FIG. 12B includes 4 internal nodes $b_{11}$, $b_{10}$, $b_{01}$, and $b_{00}$ that indicate bit locations within the binary bit positions of the stuck-at faults. The first internal node $b_{11}$ includes a first set $S_1$ of stuck-at faults in the 8 memory cells corresponding to data bit positions {1, 2, 4, 7, 9, 10, 13, 14}. The first internal node $b_{11}$ is analyzed in the first iteration through the binary tree algorithm.

The else clause is processed in the first iteration of the code of the binary tree algorithm, because some of the 8 stuck-at faults in $S_1$ are not of the same type. In the first iteration of the code of the binary tree algorithm, the stuck-at faults in the first set $S_1$ are separated into a second set $S_2$ of stuck-at faults corresponding to data bit positions {1, 2, 4, 7} and a third set $S_3$ of stuck-at faults corresponding to data bit positions {9, 10, 13, 14}. The stuck-at faults in the first set $S_i$ that have a binary bit position bit $b_{11}$ equal to 0 are placed into the second set $S_2$. The stuck-at faults in the first set $S_1$ that have a binary bit position bit $b_{11}$ equal to 1 are placed into the third set $S_3$.

The second set $S_2$ of stuck-at faults is assigned to a second internal node $b_{01}$ of the binary tree. The second internal node $b_{01}$ of the binary tree is analyzed in the second iteration of the code of the binary tree algorithm. The else clause is processed in the second iteration through the code of the binary tree algorithm, because some of the 4 stuck-at faults in $S_2$ are not of the same type. In the second iteration of the code of the binary tree algorithm, the stuck-at faults in the second set $S_2$ are separated into a fourth set $S_4$ corresponding to data bit positions {1, 4} and a fifth set $S_5$ corresponding to data bit positions {2, 7}. The stuck-at faults in the second set $S_2$ that have a binary bit position bit $b_{01}$ equal to 0 are placed into the fourth set $S_4$. The stuck-at faults in the second set $S_2$ that have a binary bit position bit $b_{01}$ equal to 1 are placed into the fifth set $S_5$.

The fourth set $S_4$ and the fifth set $S_5$ of stuck-at faults are analyzed in third and fourth iterations of the code of the binary tree algorithm, respectively. The if clause is processed in each of the third and fourth iterations of the code of the binary tree algorithm, because each of the stuck-at faults in $S_4$ are of the same type (invert), and each of the stuck-at faults in $S_5$ are of the same type (clear). Therefore, the encoder causes the fourth set $S_4$ and the fifth set $S_5$ to be leaves of the binary tree that do not have children.

The third set $S_3$ of stuck-at faults is assigned to a third internal node $b_{00}$ of the binary tree. The third internal node $b_{00}$ of the binary tree is analyzed in a fifth iteration through the binary tree algorithm. The else clause is processed in the fifth iteration of the code of the binary tree algorithm, because some of the 4 stuck-at faults in $S_3$ are not of the same type. In the fifth iteration of the code of the binary tree algorithm, the stuck-at faults in the third set $S_3$ are separated into a sixth set $S_6$ corresponding to data bit positions {10, 14} and a seventh set $S_7$ corresponding to data bit positions {9, 13}. The stuck-at faults in the third set $S_3$ that have a binary bit position bit $b_{00}$ equal to 0 are placed into the sixth set $S_6$. The stuck-at faults in the third set $S_3$ that have a binary bit position bit $b_{00}$ equal to 1 are placed into the seventh set $S_7$.

The sixth set $S_6$ of stuck-at faults is assigned to a fourth internal node $b_{10}$ of the binary tree. The fourth internal node $b_{10}$ of the binary tree is analyzed in the sixth iteration of the code of the binary tree algorithm. The else clause is processed in the sixth iteration of the code of the binary tree algorithm, because the 2 stuck-at faults in $S_6$ are not of the same type. In the sixth iteration of the code of the binary tree algorithm, the stuck-at faults in the sixth set $S_6$ are separated into an eighth set $S_8$ corresponding to data bit position {10} and a ninth set $S_9$ corresponding to data bit position {14}. The stuck-at faults in the sixth set $S_6$ that have a binary bit position bit $b_{10}$ equal to 0 are placed into the eighth set $S_8$. The stuck-at faults in the sixth set $S_6$ that have a binary bit position bit $b_{10}$ equal to 1 are placed into the ninth set $S_9$.

The eighth set $S_8$, the ninth set $S_9$, and the seventh set $S_7$ of stuck-at faults are analyzed in seventh, eighth, and ninth iterations of the code of the binary tree algorithm, respectively. The if clause is processed in each of the seventh, eighth, and ninth iterations of the code of the binary tree algorithm, because sets $S_8$ and $S_9$ each have only one stuck-at fault, and each of the stuck-at faults in set $S_7$ are of the same type (invert). Therefore, the encoder causes each of the seventh set $S_7$, the eighth set $S_8$, and the ninth set $S_9$ to be leaves of the binary tree that do not have children.

A binary tree generated by the binary tree algorithm described above has an L−1 number of internal nodes and a number of leaves L≤s, where s is the number of stuck-at faults in the corresponding memory cells. The encoder generates an $\log_2 \log_2 k$ number of index bits to represent each of the internal nodes $b_i$ of the binary tree, and there are an L−1 number of internal nodes in the binary tree. The structure of the binary tree can be represented with an 2L−1 number of index bits. One additional index bit for each of the leaves L of the binary tree is used to indicate if the data bits represented by the leaf of the binary tree are inverted or not inverted. Therefore, the maximum number of index bits |index| that the encoder generates to represent a binary tree generated by the binary tree algorithm described above is shown in equation (5) below.

$$|index| \leq (2s-1) + s + (s-1) \log_2 \log_2 k \quad (5)$$

The binary tree algorithm described above may, for example, generate a binary tree by evaluating each bit location in the binary bits positions of the data bits provided for storage in memory cells having stuck-at faults to determine which bit location to use for each of the internal nodes of the binary tree to reduce the number of nodes in the binary tree. FIG. 12C illustrates an example of a binary tree generated by a binary tree algorithm that evaluates each bit location in the binary bit positions of the data bits provided for storage in memory cells having stuck-at faults for placement in an internal node of the binary tree to reduce the number of nodes in the binary tree. In this embodiment, the binary tree algorithm selects a bit location in the binary bit positions of the stuck-at faults for the current node of the binary tree if the selected bit location allows one or both of the children of the current node to have stuck-at faults that are all of the same type. The binary tree of FIG. 12C has four leaves and three internal nodes. The binary tree of FIG. 12B has five leaves and four internal nodes.

The binary tree algorithm processes the else clause in the first iteration of the code to create the first internal node of the binary tree shown in FIG. 12C. In the first iteration of the code, the binary tree algorithm separates the first set $S_1$ of stuck-at faults based on binary bit position bit $b_{01}$ to create a second set $S_2$ of stuck-at faults corresponding to data bit positions {1, 4, 9, 13} and a third set $S_3$ of stuck-at faults corresponding to data bit positions {2, 7, 10, 14}. The stuck-at faults in the first set $S_1$ that have a binary bit position bit $b_{01}$ equal to 0 are placed into the second set $S_2$, and the stuck-at faults in the first set $S_1$ that have a binary bit position bit $b_{01}$ equal to 1 are placed into the third set $S_3$. The binary tree algorithm separates the first set $S_1$ of stuck-at faults based on binary bit position bit $b_{01}$, because the stuck-at faults in the second set $S_2$ shown in FIG. 12C are all of the same type (invert). Therefore, the stuck-at-faults in the second set $S_2$ do not need to be separated, which reduces the number of nodes in the binary tree.

The binary tree algorithm separates the third set $S_3$ of stuck-at faults based on binary bit position bit $b_{10}$ to create a fourth set $S_4$ of stuck-at faults corresponding to data bit positions {2, 10} and a fifth set $S_5$ of stuck-at faults corresponding to data bit positions {7, 14}. The stuck-at faults in the third set $S_3$ that have a binary bit position bit $b_{10}$ equal to 0 are placed into the fourth set $S_4$, and the stuck-at faults in the third set $S_3$ that have a binary bit position bit $b_{10}$ equal to 1 are placed into the fifth set $S_5$. The binary tree algorithm separates the third set $S_3$ of stuck-at faults based on binary bit position $bit_{10}$, because the stuck-at faults in the fourth set $S_4$ shown in FIG. 12C are all of the same type (clear) and do not need to be separated. The binary tree algorithm then separates the fifth set $S_5$ of stuck-at faults based on binary bit position bit $b_{00}$ to create a sixth set $S_6$ having bit position {14} and a seventh set $S_7$ having bit position {7}. The example shown in and described with respect to FIG. 11C illustrates that selecting the binary bit position bits $b_i$ for the nodes of the binary tree in a particular way can generate a more compact binary tree that is significantly smaller than the upper bound.

According to another embodiment, an encoder encodes data bits using one or more binary sub-trees of a binary tree to generate encoded data bits that accommodate stuck-at faults in memory cells. The binary sub-trees are generated using the binary tree algorithm described above. The encoded data bits are stored in the memory cells. Subsequently, the encoded data bits are read from the memory cells and decoded using the binary tree algorithm described above to regenerate the original data bits.

Figure 13:
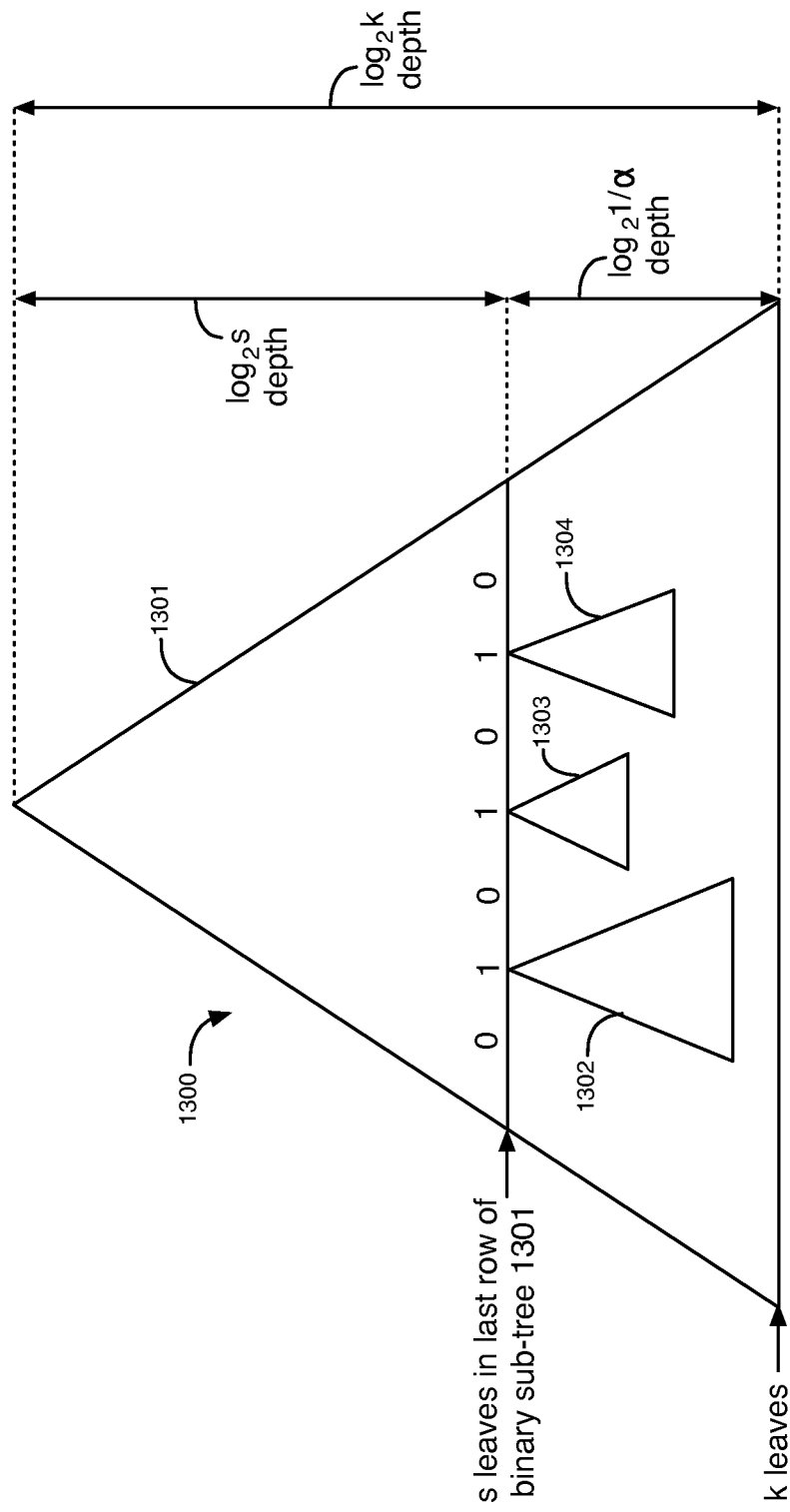
FIG. 13 illustrates a graphical example of a binary tree that is subdivided into binary sub-trees, according to an embodiment of the present invention.

FIG. 13 illustrates a graphical example of a binary tree that is generated and divided into binary sub-trees, according to an embodiment of the present invention. FIG. 13 illustrates a binary tree 1300 (i.e., the large triangle in FIG. 13). Binary tree 1300 has a $\log_2 k$ number of rows (i.e., a depth of $\log_2 k$), where each row includes at least one node. For example, the binary trees shown in FIGS. 12B and 12C that were generated for 16 data bits each contain 4 rows.

Binary tree 1300 includes a binary sub-tree 1301 having a $\log_2 s$ number of rows, and thus, a depth of $\log_2 s$, where s is the number of stuck-at faults in the corresponding memory cells. Binary tree 1300 and binary sub-tree 1301 both have the same initial internal node at the top of the largest triangle shown in FIG. 13. The last row of sub-tree 1301 has an s number of leaves, as shown in FIG. 13. For example, the last row of sub-tree 1301 has 6 leaves. Each of the leaves in the last row of sub-tree 1301 that has no stuck-at faults in the rows of binary tree 1300 below that leaf is marked with a 0. Each of the leaves in the last row of sub-tree 1301 that has stuck-at faults in rows of binary tree 1300 below that leaf is marked with a 1. Thus, each of the leaves in sub-tree 1301 that is marked with a 1 is an internal node of binary tree 1300.

Each of the leaves in the last row of sub-tree 1301 that is marked with a 1 has a sub-tree of tree 1300 below that node. For example, three binary sub-trees 1302, 1303, and 1304 are below the 3 leaves in the last row of binary sub-tree 1301 that are marked with ones, as shown in FIG. 13. The initial internal node of each of the binary sub-trees 1302-1304 is a leaf of the last row of binary sub-tree 1301 that is marked with a 1. Each of the binary sub-trees 1302-1304 below the last row of sub-tree 1301 has at most a $\log_2(1/\alpha)$ number of rows (i.e., a maximum depth of $\log_2(1/\alpha)$), as shown in FIG. 13, where $\alpha=s/k$, and k is the number of data bits. Each of binary sub-trees 1301-1304 is a sub-tree of binary tree 1300. The last row of binary tree 1300 has at most a k number of leaves.

The stuck-at faults of binary tree 1300 can be represented by creating an index that characterizes only the last row of s leaves in the binary sub-tree 1301 having a depth of $\log_2 s$ and that characterizes the stuck-at faults in the binary sub-trees 1302-1304 that are below the last row of leaves in binary sub-tree 1301. The maximum number of index bits that are generated by the encoder to represent binary tree 1300 in this embodiment is shown below in equation (6). The data bits are then encoded by inverting the subset of the data bits that do not match the corresponding stuck-at faults in last row of leaves in binary sub-tree 1301 and the corresponding stuck-at faults in binary sub-trees 1302-1304.

$$\text{index bits} \leq 4s + (1-\alpha)s \, \log_2\log_2\left(\frac{1}{\alpha}\right) \quad (6)$$

According to yet another embodiment, an encoder encodes data bits to generate encoded data bits by dividing the data bits into two halves having the same number of data bits and by exchanging the data bits between the halves to achieve the same number of stuck-at faults in each half. The encoded data bits accommodate stuck-at faults in memory cells. The encoded data bits are stored in the memory cells. Subsequently, the encoded data bits are read from the memory cells and decoded to regenerate the data bits.

Figure 14A:
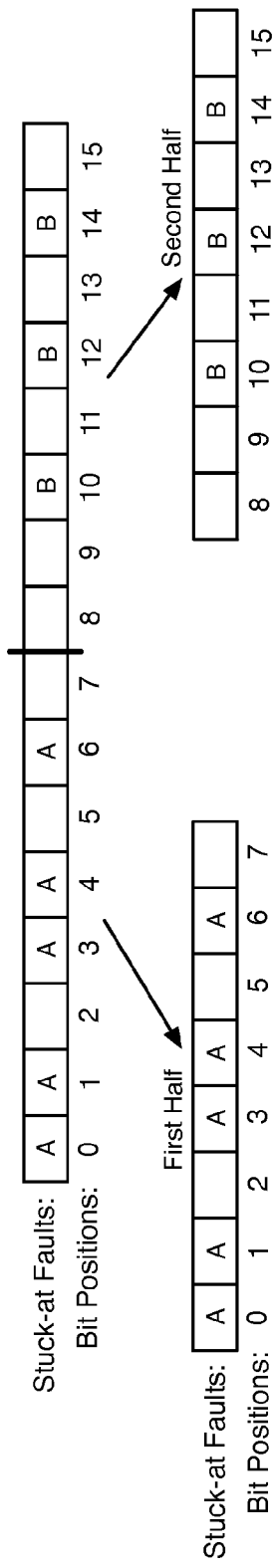
FIGS. 14A-14C illustrate an exemplary application of an encoding technique that encodes data bits by dividing the data bits into two halves and exchanging data bits between the two halves to achieve the same number of stuck-at faults in each half, according to an embodiment of the present invention.
Figure 14B:
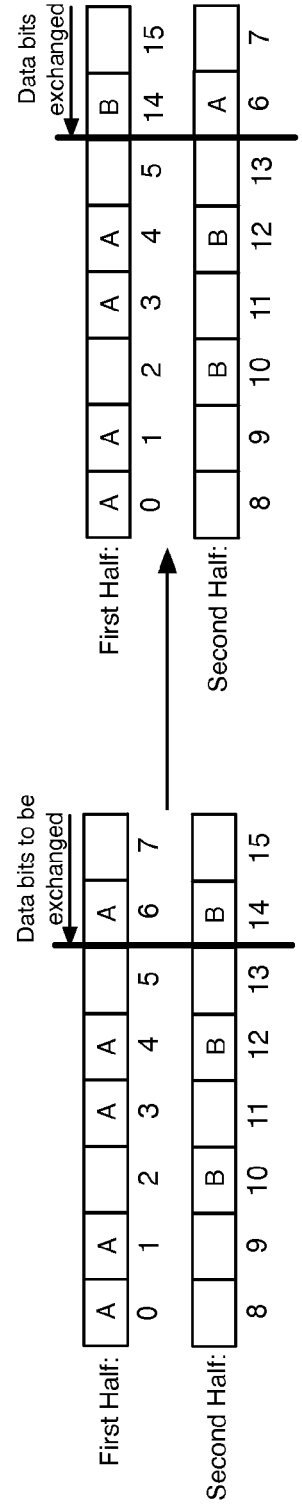
Figure 14C:
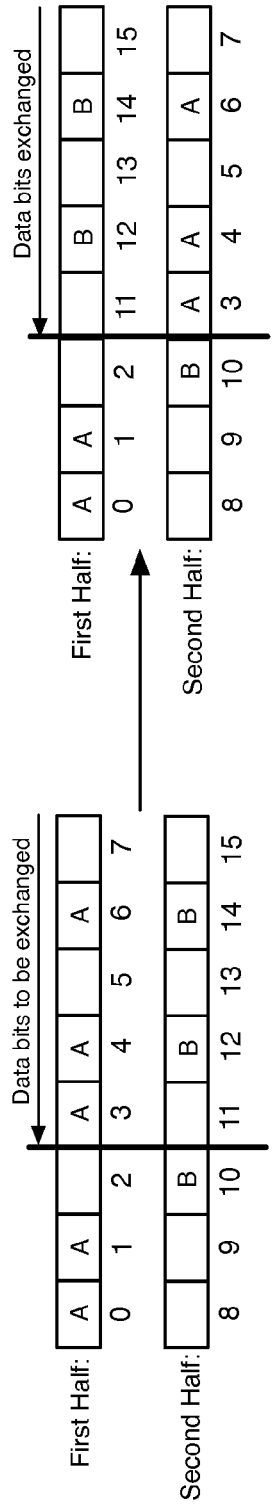

FIGS. 14A-14C illustrate an exemplary application of an encoding technique that encodes data bits by dividing the data bits into two halves and exchanging data bits between the two halves to achieve the same number of stuck-at faults in each half, according to an embodiment of the present invention. FIG. 14A illustrates bit positions 0-15 for 16 data bits provided for storage in 16 corresponding memory cells. The memory cells corresponding to bit positions 0, 1, 3, 4, 6, 10, 12, and 14 have stuck-at faults. Each of the data bits having a bit position from 0-7 that is provided for storage in a memory cell having a stuck-at fault is labeled with an A in FIGS. 14A-14C. Each of the data bits having a bit position from 8-15 that is provided for storage in a memory cell having a stuck-at fault is labeled with a B in FIGS. 14A-14C.

As shown in FIG. 14A, the encoder divides the data bits and the corresponding memory cells into two halves. The first half has the data bits having bit positions 0-7, and the second half has the data bits having bit positions 8-15. The encoder compares the number of stuck-at faults in the first half with the number of stuck-at faults in the second half. If the first half and the second half have the same number of stuck-at faults, then the encoding process continues using the same encoding technique applied to each half. The encoding technique applied to each half may, for example, be one of the encoding techniques described herein.

If the first half does not have the same number of stuck-at faults as the second half, then the encoder exchanges data bits between the first and the second halves, until the first half has the same number of stuck-at faults as the second half. In the example of FIGS. 14A-14C, the memory cells corresponding to bit positions 0-7 have 5 stuck-at faults, and the memory cells corresponding to bit positions 8-15 have 3 stuck-at faults. Therefore, the first and second halves in this example do not have the same number of stuck-at faults.

The encoder may exchange data bits between the first and the second halves in any order. In the embodiment of FIG. 14B, the encoder exchanges data bits between the first and the second halves from the highest bit position to the lowest bit position (i.e., from right to left in FIGS. 14B-14C). The encoder may, for example, exchange data bits between the first and the second halves bit-by-bit or stuck-at fault by stuck-at fault.

The thick vertical lines shown in FIGS. 14B-14C indicate the dividing lines between data bits that are exchanged between the first and the second halves and data bits that are not exchanged between the first and the second halves. The data bits to the right of the thick vertical line are exchanged between the first and the second halves. The data bits to the left of the thick vertical line are not exchanged between the first and the second halves. In an embodiment, the encoder moves the thick vertical line from right to left, exchanging bits to the right of the thick vertical line between the first and the second halves, until the first half has the same number of stuck-at faults as the second half. In an embodiment, the encoding process then continues by applying one of the encoding techniques described above, for example, to each of the first and the second halves.

As shown in FIG. 14B, if the encoder exchanges the data bits corresponding to bit positions 6 and 7 in the first half with the data bits corresponding to bit positions 14 and 15 in the second half, the first and the second halves still do not have the same number of stuck-at faults. As shown in FIG. 14C, if the encoder exchanges the data bits having bit positions 3-7 in the first half with the data bits having bit positions 11-15 in the second half, the first and the second halves then have the same number of stuck-at faults (i.e., 4 stuck-at faults).

The encoder then stores the bit positions of the last bits that were exchanged between the first and the second halves during encoding, as indicated by the thick vertical line in FIG. 14C. Because each of the first and the second halves has one-half the total number k of data bits, a $\log_2(k/2)$ number of index bits indicate the bit position of each of the last bits exchanged between the first and second halves during encoding with respect to the k/2 bits in each of the first and second halves.

The encoder can indicate the bit position of the thick vertical line in two ways. One way is to indicate a number up to k/2 (and then up to k/4, then up to k/8, and so on at subsequent levels of subdivisions) that encodes the bit position, and therefore, requires $\log_2(k/2)$ index bits (and then $\log_2(k/4)$, then $\log_2(k/8)$, and so on at subsequent levels of subdivisions). Another way is to count the number of stuck-at faults that are on the right side of the thick vertical line, and encode this number, therefore requiring $\log_2(s)$ index bits (and then $\log_2(s/2)$, then $\log_2(s/4)$, and so on at subsequent levels of subdivisions). In this embodiment, the encoder generates index bits that represent the exact bit positions of the stuck-at faults. Therefore, knowing the number of stuck-at faults to the right of the thick vertical line uniquely defines the bit position from where the exchange will take place between the two halves.

In one embodiment, the encoder generates a $\log_2(k/2)$ number of index bits to indicate the bit position of each of the last bits that were exchanged between the first and the second halves during encoding. The decoder uses the bit position indicated by the $\log_2(k/2)$ number of index bits to reconstruct the original data bits. In example of FIGS. 14A-14C, k/2=8, and $\log_2(k/2)$=3. Therefore, if the example of FIGS. 14A-14C is applied to this embodiment, 3 index bits are generated to indicate the bit position of each of the last bits exchanged between the first and second halves during encoding. In the example of FIG. 14C, the last bits exchanged between the halves during encoding correspond to bit positions 3 and 11. The data bits provided for storage in bit positions 3 and 11 are each in bit position 3 with respect to the 8 bits (numbered 0-7) that are in each of the first and the second halves. Therefore, in this example, index bits of 011 (which equal 3) are generated to indicate the bit position of each of the last bits exchanged between the first and second halves during the generation of the encoded data bits.

In another embodiment, the encoder stores a $\log_2 s$ number of index bits to indicate the bit positions of the data bits exchanged between the first and second halves during encoding, where s is the number of stuck-at faults in the corresponding memory cells where the encoded data bits are stored. In this embodiment, the $\log_2 s$ index bits indicate the number of stuck-at faults in the first and second halves that were exchanged between the first and second halves during encoding. The decoder uses the $\log_2 s$ index bits to determine the bit positions where data bits were exchanged between the first and second halves during encoding.

In the example of FIG. 14C, $\log_2 s$ equals 3, and the last bits exchanged during encoding are at bit positions 3 and 11. The number indicated by the $\log_2 s$ index bits is 5, because there are 5 stuck-at faults in the 10 memory cells in the first and second halves that were exchanged between the first and second halves during encoding. In this example, index bits of 101 are generated to indicate the bit position of each of the last bits exchanged between the first and second halves during encoding.

Equation (7) below indicates the number of index bits that an encoder may generate to represent k data bits provided for storage in memory cells having s stuck-at faults, where the error rate a=s/k. To generate equation (7), an encoder divides the data bits into two equal halves, and exchanges data bits between the two halves so that each half has the same number of stuck-at faults, as described above. In equation (7), $$\text{index}\left(\frac{k}{2}, \alpha, \frac{s}{2}\right)$$

is the number of index bits that are generated by applying the same encoding technique to each half of the data bits, where each half has the same number of stuck-at faults.

$$\text{index}(k, \alpha, s) = 2\left(\text{index}\left(\frac{k}{2}, \alpha, \frac{s}{2}\right)\right) + \log_2 s \qquad (7)$$

After the data bits have been divided into two equal halves that each has the same number of stuck-at faults, each of these two halves of data bits is subdivided into two equal quarters of data bits to generate four quarters that each has the same number of data bits. Data bits are exchanged between the first two quarters so that each of the first two quarters has the same number of stuck-at faults, and data bits are exchanged between the second two quarters so that each of the second two quarters has the same number of stuck-at faults, as described above with respect to the first and second halves.

Each of the four quarters of data bits is then subdivided into two equal eighths of data bits to generate eight subdivisions. Each of the eight subdivisions has the same number of data bits. The process of exchanging data bits is then repeated for each set of two of the eight subdivisions, each set of two of sixteen subdivisions, etc., until each of the smallest subdivisions of data bits has exactly one stuck-at fault in its corresponding memory cells. After there is exactly 1 stuck-at fault in each of the smallest subdivisions, then $\log_2(1/\alpha)$ index bits can be used to represent the bit position of each of the stuck-at faults. Equations (8)-(15) below indicate the number of index bits that may be generated by an encoder to represent encoded data bits using these encoding techniques. Equations (8)-(14) show only the number of index bits in the index used to indicate the bit positions of the stuck-at faults. Equation (15) includes an additional s number of index bits are added to the index to indicate whether each of the encoded data bits stored in a memory cell having a stuck-at fault was inverted or not inverted relative to the corresponding original data bit.

$$\text{index}(k, \alpha, s) = 2\left[2\left(\text{index}\left(\frac{k}{4}, \alpha, \frac{s}{4}\right)\right) + \log_2 \frac{s}{2}\right] + \log_2 s \qquad (8)$$

$$\text{index}(k, \alpha, s) = 2\left[2\left[2\left(\text{index}\left(\frac{k}{8}, \alpha, \frac{s}{8}\right)\right) + \log_2 \frac{s}{4}\right] + \log_2 \frac{s}{2}\right] + \log_2 s \qquad (9)$$

$$\text{index}(k, \alpha, s) = 2^{\log_2 s}\text{index}\left(\frac{k}{s}, \alpha, 1\right) + \sum_{i=0}^{((\log_2 s)-1)} 2^i \log_2 \frac{s}{2^i} \qquad (10)$$

$$\text{index}(k, \alpha, s) = s\log_2 \frac{1}{\alpha} + s\log_2 s - \log_2 s - \sum_{i=0}^{((\log_2 s)-1)} i 2^i \qquad (11)$$

$$\text{index}(k, \alpha, s) = s\log_2 \frac{1}{\alpha} + s\log_2 s - \log_2 s - [(\log_2 s - 2)s + 2] \qquad (12)$$

$$\text{index}(k, \alpha, s) = 2s - \log_2 s - 2 + s\log_2 \frac{1}{\alpha} \qquad (13)$$

$$\text{index}(k, \alpha, s) = s\left(2 + \log_2 \frac{1}{\alpha}\right) - \log_2 s - 2 \qquad (14)$$

$$\text{index}(k, \alpha, s) = s + s\left(2 + \log_2 \frac{1}{\alpha}\right) - \log_2 s - 2 \qquad (15)$$

Figure 15:
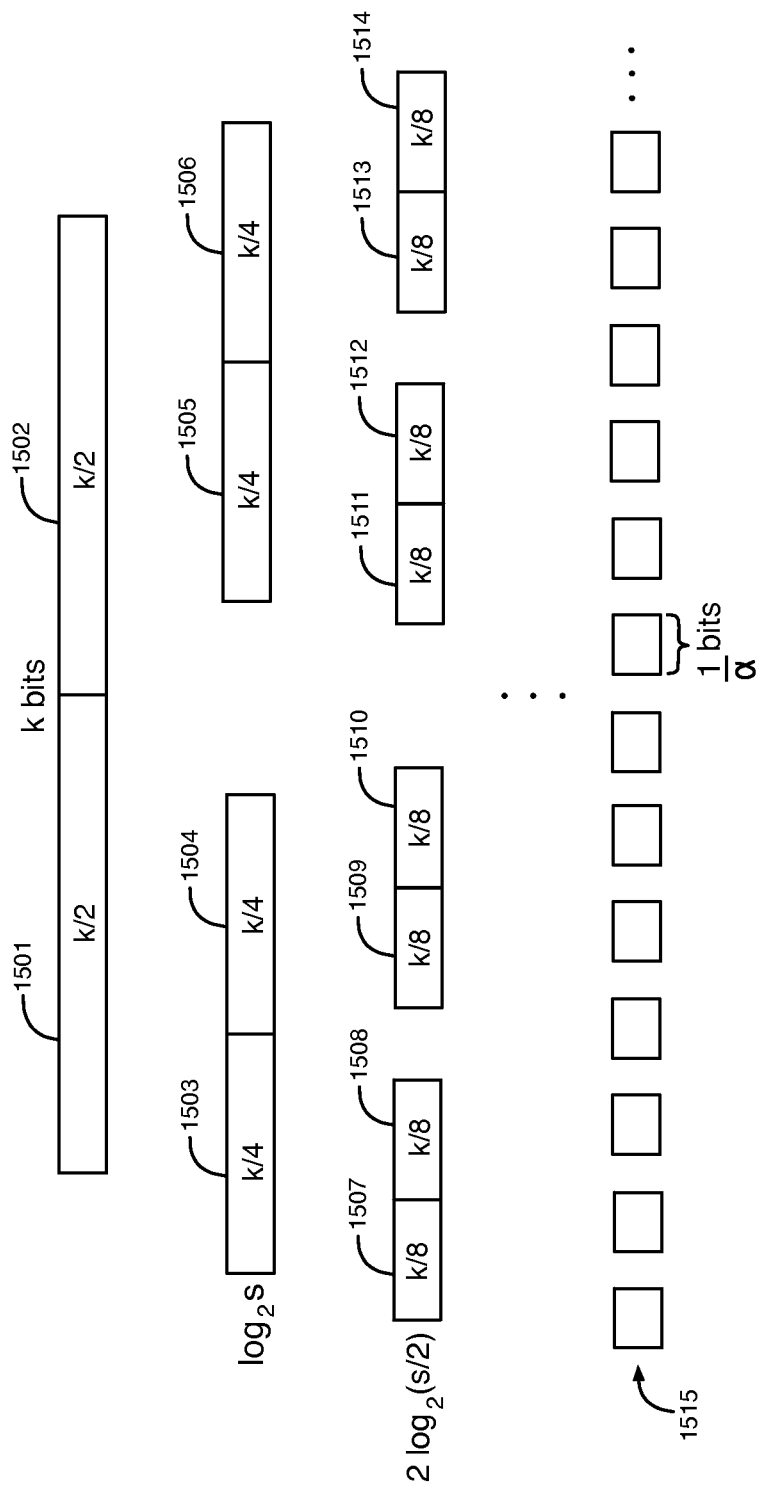
FIG. 15 illustrates graphically how a block of data bits can be continuously subdivided into equal subdivisions of data bits, until each of the smallest subdivisions has exactly one stuck-at fault, according to an embodiment of the present invention.

FIG. 15 illustrates graphically how a block of data bits can be continuously subdivided into equal subdivisions of data bits, until each of the smallest subdivisions has exactly one stuck-at fault, according to an embodiment of the present invention. Initially, an encoder divides a k number of data bits into two subdivisions 1501 and 1502 that each has a k/2 number of data bits. The encoder exchanges data bits between subdivisions 1501 and 1502 so that each of the subdivisions 1501 and 1502 has the same number of stuck-at faults, as described above.

Subsequently, the encoder subdivides the k/2 number of data bits in subdivision 1501 into two subdivisions 1503 and 1504 that each has a k/4 number of data bits, and the encoder subdivides the k/2 number of data bits in subdivision 1502 into two equal subdivisions 1505 and 1506 that each has a k/4 number of data bits. The encoder exchanges data bits between subdivisions 1503 and 1504 so that each of the subdivisions 1503 and 1504 has the same number of stuck-at faults, as described above. The encoder exchanges data bits between subdivisions 1505 and 1506 so that each of the subdivisions 1505 and 1506 has the same number of stuck-at faults, as described above.

The encoder then subdivides the k/4 number of data bits in each of the subdivisions 1503-1506 into two subdivisions that each has a k/8 number of data bits. Thus, subdivision 1503 is subdivided into subdivisions 1507-1508, subdivision 1504 is subdivided into subdivisions 1509-1510, subdivision 1505 is subdivided into subdivisions 1511-1512, and subdivision 1506 is subdivided into subdivisions 1513-1514. Each of subdivisions 1507-1514 has k/8 data bits. The encoder exchanges data bits between subdivisions 1507 and 1508, between subdivisions 1509 and 1510, between subdivisions 1511 and 1512, and between subdivisions 1513-1514 so that each of the subdivisions 1507-1514 has the same number of stuck-at faults, as described above.

The encoder continues the process of subdividing each of the subdivisions into smaller subdivisions having an equal number of data bits, until each of the smallest subdivisions has exactly one stuck-at fault. When each of the smallest subdivisions has exactly one stuck-at fault, the subdividing process terminates. Each of the smallest subdivisions has a 1/a number of data bits. FIG. 15 illustrates an example of the smallest subdivisions 1515 each having a 1/a number of data bits. The encoding process then continues using, for example, one of the encoding techniques described above to encode the data bits in each of the smallest subdivisions. The number of data bits in each of the smallest subdivisions may be recorded in the index bits.

Embodiments of the present invention can, for example, be implemented using one or a combination of hardware, software, and a computer-readable medium containing program instructions. Embodiments of the present invention can be embodied as program code stored on a non-transitory computer readable medium that can be run on a computer. Software implemented by embodiments of the present invention and results of the present invention can be stored on a computer-readable medium such as semiconductor memory, hard disk drive, compact disc (CD), digital video disc (DVD), or other media. Results of the present invention can be used for various purposes such as being executed or processed by a processor, being displayed to a user, transmitted in a signal over a network, etc. Embodiments of the present invention may also be embodied as a computer readable program code unit stored on a non-transitory computer readable medium, for causing a number of computer systems connected via a network to affect distributed processing.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A data storage system comprising:
    a memory circuit; and
    a control circuit to receive data bits provided for storage in memory cells of the memory circuit,
    wherein the control circuit compares each of the data bits provided for storage in a corresponding one of the memory cells having a stuck-at fault to a value of the stuck-at fault, wherein the control circuit inverts each of the data bits having a different value than the value of the stuck-at fault of the corresponding one of the memory cells to generate encoded data bits, and
    wherein the control circuit generates redundant bits that indicate the encoded data bits to invert to regenerate the data bits.

2. The data storage system of claim 1, wherein the control circuit inverts digital values of a first subset of the data bits having a first set of bit positions to generate a first subset of the encoded data bits, wherein the first subset of the data bits are provided for storage in a first subset of the memory cells that has at least one memory cell having a stuck-at fault and at least one memory cell without a stuck-at fault, and wherein the control circuit generates the redundant bits to indicate the first set of the bit positions.

3. The data storage system of claim 2, wherein the control circuit maintains digital values of a second subset of the data bits having a second set of bit positions to generate a second subset of the encoded data bits, wherein the second subset of the data bits are provided for storage in a second subset of the memory cells that has at least one memory cell having a stuck-at fault and at least one memory cell without a stuck-at fault, and wherein the control circuit generates the redundant bits to indicate the second set of the bit positions.

4. The data storage system of claim 3, wherein the control circuit selects the first and the second sets of bit positions based on a bit at a bit location in each of the bit positions in the first and the second sets such that the bits at the bit location in the bit positions of the data bits in the first subset have a first digital value and the bits at the bit location in the bit positions of the data bits in the second subset have a second digital value.

5. The data storage system of claim 1, wherein the control circuit encodes the data bits to generate the encoded data bits using a binary tree, wherein the binary tree comprises leaves and internal nodes, wherein each of the internal nodes corresponds to a unique bit location in bit positions of the data bits, wherein each of the leaves corresponds to a subset of the data bits that have one of a first type or a second type, wherein the control circuit inverts the data bits of the first type to match values of corresponding stuck-at faults, and wherein the control circuit maintains values of the data bits of the second type to match values of corresponding stuck-at faults.

6. The data storage system of claim 5, wherein the binary tree comprises first and second binary sub-trees that are used to generate the redundant bits.

7. The data storage system of claim 1, wherein the control circuit divides the data bits into first and second halves and exchanges the data bits between the first and the second halves to cause the data bits in the first half to be provided for storage in a first subset of the memory cells that have a first number of stuck-at faults and to cause the data bits in the second half to be provided for storage in a second subset of the memory cells that have the first number of stuck-at faults, and wherein the control circuit generates the redundant bits based on bit positions of the encoded data bits within the first and the second halves.

8. The data storage system of claim 7, wherein the control circuit divides the data bits in the first half into first and second quarters and exchanges the data bits in the first half between the first and the second quarters to cause the data bits in the first quarter to be provided for storage in a third subset of the memory cells having a second number of stuck-at faults and to cause the data bits in the second quarter to be provided for storage in a fourth subset of the memory cells having the second number of stuck-at faults,
    wherein the control circuit divides the data bits in the second half into third and fourth quarters and exchanges the data bits in the second half between the third and the fourth quarters to cause the data bits in the third quarter to be provided for storage in a fifth subset of the memory cells having the second number of stuck-at faults and to cause the data bits in the fourth quarter to be provided for storage in a sixth subset of the memory cells having the second number of stuck-at faults, and wherein the control circuit generates the redundant bits based on bit positions of the encoded data bits within the first, the second, the third, and the fourth quarters.

9. The data storage system of claim 8, wherein the control circuit continues to subdivide the data bits into subdivisions each having an equal number of data bits until each of the subdivisions is provided for storage in a subset of the memory cells having only one stuck-at fault.

10. A data storage system comprising:
a memory circuit; and
a control circuit to receive data bits provided for storage in memo cells of the memory circuit,
wherein the control circuit compares each of the data bits provided for storage in a corresponding one of the memory cells having a stuck-at fault to a value of the stuck-at fault wherein the control circuit inverts each of the data bits having a different value than the value of the stuck-at fault of the corresponding one of the memory cells to generate encoded data bits,
wherein the control circuit generates redundant bits that indicate the encoded data bits to invert to regenerate the data bits, and wherein the control circuit generates the redundant bits to indicate a bit position of each of the encoded data bits that is stored in one of the memory cells having one of the stuck-at faults.

11. A method comprising:
receiving data bits that are provided for storage in memory cells of a memory circuit;
comparing each of the data bits provided for storage in a corresponding one of the memory cells having a stuck-at fault to a value of the stuck-at fault;
generating encoded data bits by inverting each of the data bits having a different value than the value of the stuck-at fault of the corresponding one of the memory cells; and
generating redundant bits that indicate at least one operation to perform on the encoded data bits to regenerate the data bits.

12. The method of claim 11, wherein generating redundant bits that indicate at least one operation to perform on the encoded data bits to regenerate the data bits further comprises generating the redundant bits to indicate a bit position of each of the encoded data bits that is stored in one of the memory cells having one of the stuck-at faults.

13. The method of claim 11, wherein generating encoded data bits by inverting each of the data bits having a different value than the value of the stuck-at fault of the corresponding one of the memory cells further comprises inverting digital values of a first subset of the data bits having a first set of bit positions to generate a first subset of the encoded data bits, wherein the first subset of the data bits are provided for storage in a first subset of the memory cells that has at least one memory cell having a stuck-at fault and at least one memory cell without a stuck-at fault, and wherein the redundant bits indicate the first set of the bit positions.

14. The method of claim 13, wherein generating encoded data bits by inverting each of the data bits having a different value than the value of the stuck-at fault of the corresponding one of the memory cells further comprises maintaining digital values of a second subset of the data bits having a second set of bit positions to generate a second subset of the encoded data bits, wherein the second subset of the data bits are provided for storage in a second subset of the memory cells that has at least one memory cell having a stuck-at fault and at least one memory cell without a stuck-at fault, and wherein the redundant bits indicate the second set of the bit positions.

15. The method of claim 14, wherein generating encoded data bits by inverting each of the data bits having a different value than the value of the stuck-at fault of the corresponding one of the memory cells further comprises selecting the first and the second sets of bit positions based on a bit at a bit location in each of the bit positions in the first and the second sets such that the bits at the bit location in the bit positions of the data bits in the first subset have a first digital value and the bits at the bit location in the bit positions of the data bits in the second subset have a second digital value.

16. The method of claim 11, wherein generating encoded data bits by inverting each of the data bits having a different value than the value of the stuck-at fault of the corresponding one of the memory cells further comprises:
generating a binary tree that comprises leaves and internal nodes, wherein each of the internal nodes corresponds to a unique bit location in bit positions of the data bits, and wherein each of the leaves corresponds to a subset of the data bits that have one of a first type or a second type;
inverting the data bits of the first type to match values of corresponding stuck-at faults to generate a first subset of the encoded data bits; and
maintaining values of the data bits of the second type to match values of corresponding stuck-at faults to generate a second subset of the encoded data bits.

17. The method of claim 16, wherein generating a binary tree that comprises leaves and internal nodes further comprises generating first and second binary sub-trees that are used to generate the encoded data bits.

18. The method of claim 11, wherein generating redundant bits that indicate at least one operation to perform on the encoded data bits to regenerate the data bits further comprises:
dividing the data bits into first and second halves;
exchanging the data bits between the first and the second halves to cause the data bits in the first half to be provided for storage in a first subset of the memory cells that have a first number of stuck-at faults and to cause the data bits in the second half to be provided for storage in a second subset of the memory cells that have the first number of stuck-at faults; and
generating the redundant bits based on bit positions of the encoded data bits within the first and the second halves.

19. The method of claim 18, wherein generating redundant bits that indicate at least one operation to perform on the encoded data bits to regenerate the data bits further comprises:
dividing the data bits in the first half into first and second quarters;
exchanging the data bits in the first half between the first and the second quarters to cause the data bits in the first quarter to be provided for storage in a third subset of the memory cells having a second number of stuck-at faults and to cause the data bits in the second quarter to be provided for storage in a fourth subset of the memory cells having the second number of stuck-at faults;
dividing the data bits in the second half into third and fourth quarters;
exchanging the data bits in the second half between the third and the fourth quarters to cause the data bits in the third quarter to be provided for storage in a fifth subset of the memory cells having the second number of stuck-at faults and to cause the data bits in the fourth quarter to be provided for storage in a sixth subset of the memory cells having the second number of stuck-at faults; and generating the redundant bits based on bit positions of the encoded data bits within the first, the second, the third, and the fourth quarters.

20. The method of claim 19, wherein generating redundant bits that indicate at least one operation to perform on the encoded data bits to regenerate the data bits further comprises continuing to subdivide the data bits into subdivisions each having an equal number of data bits until each of the subdivisions is provided for storage in a subset of the memory cells having only one stuck-at fault.

* * * * *